(12) United States Patent
Shin et al.

(10) Patent No.: US 12,429,731 B2
(45) Date of Patent: Sep. 30, 2025

(54) DISPLAY APPARATUS AND LIGHT APPARATUS THEREOF

(71) Applicant: SAMSUNG ELECTRONICS CO., LTD., Suwon-si (KR)

(72) Inventors: Seungyong Shin, Suwon-si (KR); Sungyeol Kim, Suwon-si (KR); Hyukjun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 168 days.

(21) Appl. No.: 18/195,471

(22) Filed: May 10, 2023

(65) Prior Publication Data
US 2024/0036398 A1 Feb. 1, 2024

Related U.S. Application Data

(63) Continuation of application No. PCT/KR2023/005641, filed on Apr. 26, 2023.

(30) Foreign Application Priority Data

Jul. 26, 2022 (KR) .................. 10-2022-0092797
Oct. 7, 2022 (KR) .................. 10-2022-0129082
Jan. 2, 2023 (KR) .................. 10-2023-0000424

(51) Int. Cl.
*G02F 1/1335* (2006.01)

(52) U.S. Cl.
CPC .. *G02F 1/133612* (2021.01); *G02F 1/133613* (2021.01); *G02F 2203/48* (2013.01)

(58) Field of Classification Search
CPC ......... G02F 1/133602; G02F 1/133612; G02F 1/133601; G09G 3/3426; G09G 3/34
See application file for complete search history.

(56) References Cited

U.S. PATENT DOCUMENTS 8,067,897 B2  11/2011 Park et al.
8,564,507 B2  10/2013 Jang et al.
(Continued)

FOREIGN PATENT DOCUMENTS

EP  4 009 315 A1  6/2022
JP  2017-198809 A  11/2017
(Continued)

OTHER PUBLICATIONS

Communication dated Aug. 25, 2023, issued by the International Searching Authority in counterpart International Application No. PCT/KR2023/005641 (PCT/ISA/210).
(Continued)

*Primary Examiner* — Kevin M Nguyen
(74) *Attorney, Agent, or Firm* — Sughrue Mion, PLLC

(57) ABSTRACT

In some embodiments, a display apparatus includes a liquid crystal panel, and a light apparatus including a substrate including a plurality of dimming blocks that are arranged in a matrix, a power wire configured to supply power to the plurality of dimming blocks, and a plurality of driving devices configured to control a driving current supplied to the plurality of dimming blocks. Each dimming block of the plurality of dimming blocks includes a plurality of light sources. A second dimming block of the plurality of dimming blocks is arranged in an $(n+1)^{th}$ row adjacent to the $n^{th}$ row. The power wire is arranged between the $n^{th}$ row corresponding to the first dimming block and the $(n+1)^{th}$ row. The power wire is coupled to a first light source of the first dimming block and to a second light source of the second dimming block.

18 Claims, 16 Drawing Sheets

(56) References Cited

U.S. PATENT DOCUMENTS

| | | | |
|---|---|---|---|
| 9,960,223 | B2 | 5/2018 | Ebisuno et al. |
| 10,395,590 | B1 | 8/2019 | Lin et al. |
| 11,417,287 | B2 | 8/2022 | Kim et al. |
| 11,557,259 | B2 | 1/2023 | Kim et al. |
| 2002/0057266 | A1 | 5/2002 | Miyajima |
| 2009/0309855 | A1* | 12/2009 | Wang ................... G09G 3/32 345/82 |
| 2010/0052564 | A1 | 3/2010 | Park et al. |
| 2021/0096423 | A1* | 4/2021 | Shin ................... G09G 3/342 |
| 2021/0098671 | A1 | 4/2021 | Kawano |
| 2021/0398498 | A1 | 12/2021 | Kim et al. |
| 2022/0172674 | A1 | 6/2022 | Oh et al. |
| 2022/0180835 | A1 | 6/2022 | Shimoshikiryoh et al. |
| 2022/0196230 | A1 | 6/2022 | Matsuda |
| 2022/0223576 | A1 | 7/2022 | Oh et al. |
| 2022/0244597 | A1* | 8/2022 | Tong ................ G02F 1/133601 |
| 2024/0170628 | A1* | 5/2024 | Liu ..................... H01L 25/167 |

FOREIGN PATENT DOCUMENTS

| | | |
|---|---|---|
| JP | 2022-98041 A | 7/2022 |
| KR | 10-2010-0025872 A | 3/2010 |
| KR | 10-2011-0125027 A | 11/2011 |
| KR | 10-2018-0062224 A | 6/2018 |
| KR | 10-2020-0068314 A | 6/2020 |
| KR | 10-2305951 B1 | 9/2021 |
| KR | 10-2312357 B1 | 10/2021 |
| KR | 10-2022-0022911 A | 3/2022 |
| KR | 10-2022-0068446 A | 5/2022 |
| KR | 10-2022-0078522 A | 6/2022 |
| KR | 10-2022-0101949 A | 7/2022 |

OTHER PUBLICATIONS

Communication dated Aug. 25, 2023, issued by the International Searching Authority in counterpart International Application No. PCT/KR2023/005641 (PCT/ISA/237).

Communication issued Jan. 18, 2024 by the Korean Patent Office in Korean Application No. 10-2023-0000424.

Communication issued May 12, 2025 by the European Patent Office in European Patent Application No. 23846744.3.

* cited by examiner

DISPLAY APPARATUS AND LIGHT APPARATUS THEREOF

CROSS-REFERENCE TO RELATED APPLICATION

This application is a continuation application of International Application No. PCT/KR2023/005641, filed on Apr. 26, 2023, which claims priority to Korean Patent Application No. 10-2022-0092797, filed on Jul. 26, 2022, Korean Patent Application No. 10-2022-0129082, filed on Oct. 7, 2022, and Korean Patent Application No. 10-2023-0000424, filed on Jan. 2, 2023, in the Korean Intellectual Property Office, the disclosures of which are incorporated by reference herein in their entireties.

BACKGROUND

1. Field

The present disclosure relates generally to display apparatuses, and more particularly, to a display apparatus including a light apparatus.

2. Description of the Related Art

Typically, a display apparatus may refer to a type of an output device that may convert obtained and/or stored electrical information into visual information and that may display the visual information to a user. As such, display apparatuses may be used in various fields such as, but not limited to, homes, workplaces, retail store premises, parks, and open spaces.

Examples of display apparatuses may include, but not be limited to, monitor devices connected to personal computers (PCs) and/or server computers, portable computer devices, navigation terminal devices, general television (TV) devices, Internet protocol TV (IPTV) devices, portable terminal devices (e.g., smart phones, tablet PCs, personal digital assistants (PDAs), cellular phones). Other examples of display apparatuses may further include various types of display devices used to reproduce videos, such as advertisements and/or movies, in an industrial field, various types of audio/video systems, and the like.

Display apparatuses may be classified into self-emitting display apparatuses and non-self-emitting display apparatuses. A display apparatus may include a light apparatus to convert the electrical information into visual information. The light apparatus may include a plurality of light sources that emit light independently. Each of the plurality of light sources may include, for example, light-emitting diodes (LEDs), organic LEDs (OLEDs), polymer light emitting diodes (PLEDs), and the like.

A local dimming technology may be applied to a light apparatus (e.g., a backlight unit) of a non-self-emitting display to improve a contrast ratio of an image. For example, the plurality of light sources may be divided into a plurality of dimming blocks, and a driving device may control a driving current supplied to the light sources included in one or more of the plurality of dimming blocks.

Alternatively or additionally, drive elements and light sources (e.g., LEDs) may be fixed on a substrate by using surface mount technology (SMT).

Recently, the number of driving devices and/or light sources used by display apparatuses have been increased in order to implement display apparatuses having high contrast ratios. Consequently, the number of wires needed by a substrate of the display apparatuses has also been increased.

SUMMARY

Aspects of the present disclosure provide a light apparatus and a display apparatus, including the light apparatus, that may reduce and/or minimize the number of wires included in a display apparatus.

According to an aspect of the present disclosure, a display apparatus is provided. The display apparatus includes a liquid crystal panel, and a light apparatus. The light apparatus includes a substrate including a plurality of dimming blocks that are arranged in a matrix, a power wire configured to supply power to the plurality of dimming blocks, and a plurality of driving devices configured to control a driving current supplied to the plurality of dimming blocks. Each dimming block of the plurality of dimming blocks includes a plurality of light sources. The plurality of dimming blocks includes a first dimming block including a first plurality of light sources and a second dimming block including a second plurality of light sources. The first dimming block is arranged in an $n^{th}$ row and the second dimming block is arranged in an $(n+1)^{th}$ row adjacent to the $n^{th}$ row, where n is a natural number. The power wire is arranged between the $n^{th}$ row corresponding to the first dimming block and the $(n+1)^{th}$ row corresponding to the second dimming block. The power wire is coupled to a first light source of the first plurality of light sources and to a second light source of the second plurality of light sources.

In some embodiments, the plurality of dimming blocks may further include a third dimming block that may be arranged in an $(n+2)^{th}$ row adjacent to the $(n+1)^{th}$ row. The power wire may be absent between the $(n+1)^{th}$ row corresponding to the second dimming block and the $(n+2)^{th}$ row corresponding to the third dimming block.

In some embodiments, the plurality of dimming blocks may further include a fourth dimming block arranged in an $(n+3)^{th}$ row adjacent to the $(n+2)^{th}$ row. The third dimming block may include a third plurality of light sources. The fourth dimming block may include a fourth plurality of light sources. The power wire may be arranged between the $(n+2)^{th}$ row corresponding to the third dimming block and the $(n+3)^{th}$ row corresponding to the fourth dimming block. The power wire may be coupled to a third light source of the third plurality of light sources and to a fourth light source of the fourth plurality of light sources.

In some embodiments, the first light source may be adjacent to the second light source in a column direction.

In some embodiments, the first plurality of light sources may be arranged in a first matrix in the first dimming block. The second plurality of light sources may be arranged in a second matrix in the second dimming block. The plurality of driving devices may include a first driving device configured to control a first driving current supplied to the first dimming block and the second dimming block. A fifth light source of the first plurality of light sources may be coupled to the first driving device. A sixth light source of the second plurality of light sources may be coupled to the first driving device. The fifth light source and the sixth light source may be arranged in a same column.

In some embodiments, the first light source coupled to the power wire and the fifth light source coupled to the first driving device may be arranged in a same row.

In some embodiments, the second light source coupled to the power wire and the sixth light source coupled to the first driving device may be arranged farthest from each other among the second plurality of light sources.

In some embodiments, the first plurality of light sources may be arranged in a first matrix in the first dimming block. The second plurality of light sources may be arranged in a second matrix in the second dimming block. The first plurality of light sources may be coupled to each other in series. The second plurality of light sources may be coupled to each other in series. A first pattern of a first wire coupling the first plurality of light sources to each other in series may be different from a second pattern of a second wire coupling the second plurality of light sources to each other in series.

In some embodiments, the first plurality of light sources may be arranged in a first matrix in the first dimming block. A third light source of the first plurality of light sources may be coupled to a first driving device of the plurality of driving devices. The first light source coupled to the power wire and the third light source coupled to the first driving device may be arranged in a same row.

In some embodiments, the second plurality of light sources may be arranged in a second matrix in the second dimming block. A fourth light source of the second plurality of light sources may be coupled to the first driving device. The second light source coupled to the power wire and the fourth light source coupled to the first driving device may be arranged in rows disposed farthest from each other.

In some embodiments, the display apparatus of claim 1 may further include a plurality of data lines configured to transmit data signals to the plurality of driving devices, and a dimming driver configured to transmit the data signals to the plurality of driving devices through the plurality of data lines based on dimming data corresponding to an input image.

In some embodiments, the display apparatus may further include a plurality of scan lines configured to transmit scan signals to the plurality of driving devices, and a dimming driver configured to transmit the scan signals to the plurality of driving devices through the plurality of scan lines.

In some embodiments, the display apparatus may further include a dimming driver configured to supply a driving voltage to the plurality of dimming blocks through the power wire.

In some embodiments, a first driving device from among the plurality of driving devices may be configured to control driving currents supplied to at least two dimming blocks of the plurality of dimming blocks arranged in two adjacent rows.

In some embodiments, the plurality of light sources included by each dimming block of the plurality of dimming blocks may be arranged in another matrix. At least two light sources coupled to the first driving device may be arranged in a column adjacent to the first driving device.

According to an aspect of the present disclosure, a light apparatus is provided. The light apparatus includes a substrate including a plurality of dimming blocks that are arranged in a matrix, a power wire configured to supply power to the plurality of dimming blocks, and a plurality of driving devices configured to control a driving current supplied to the plurality of dimming blocks. Each dimming block of the plurality of dimming blocks including a plurality of light sources. The plurality of dimming blocks includes a first dimming block including a first plurality of light sources and a second dimming block including a second plurality of light sources. The first dimming block is arranged in an $n^{th}$ row and the second dimming block is arranged in an $(n+1)^{th}$ row adjacent to the $n^{th}$ row, where n is a natural number. The power wire is arranged between the $n^{th}$ row corresponding to the first dimming block and the $(n+1)^{th}$ row corresponding to the second dimming block. The power wire is coupled to a first light source of the first plurality of light sources and to a second light source of the second plurality of light sources.

In some embodiments, the plurality of dimming blocks may further include a third dimming block that may be arranged in an $(n+2)^{th}$ row adjacent to the $(n+1)^{th}$ row. The power wire may be absent between the $(n+1)^{th}$ row corresponding to the second dimming block and the $(n+2)^{th}$ row corresponding to the third dimming block.

In some embodiments, the plurality of dimming blocks may further include a fourth dimming block that may be arranged in an $(n+3)^{th}$ row adjacent to the $(n+2)^{th}$ row. The third dimming block may include a third plurality of light sources. The fourth dimming block may include a fourth plurality of light sources. The power wire may be arranged between the $(n+2)^{th}$ row corresponding to the third dimming block and the $(n+3)^{th}$ row corresponding to the fourth dimming block. The power wire may be coupled to a third light source of the third plurality of light sources and to a fourth light source of the fourth plurality of light sources.

In some embodiments, the first light source may be adjacent to the second light source in a column direction.

In some embodiments, the first plurality of light sources may be arranged in a first matrix in the first dimming block. The second plurality of light sources may be arranged in a second matrix in the second dimming block. The plurality of driving devices may include a first driving device configured to control a first driving current supplied to the first dimming block and the second dimming block. A third light source of the first plurality of light sources may be coupled to the first driving device. A fourth light source of the second plurality of light sources may be coupled to the first driving device. The third light source and the fourth light source may be arranged in a same column.

Additional aspects are set forth in part in the description which follows and, in part, are to be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
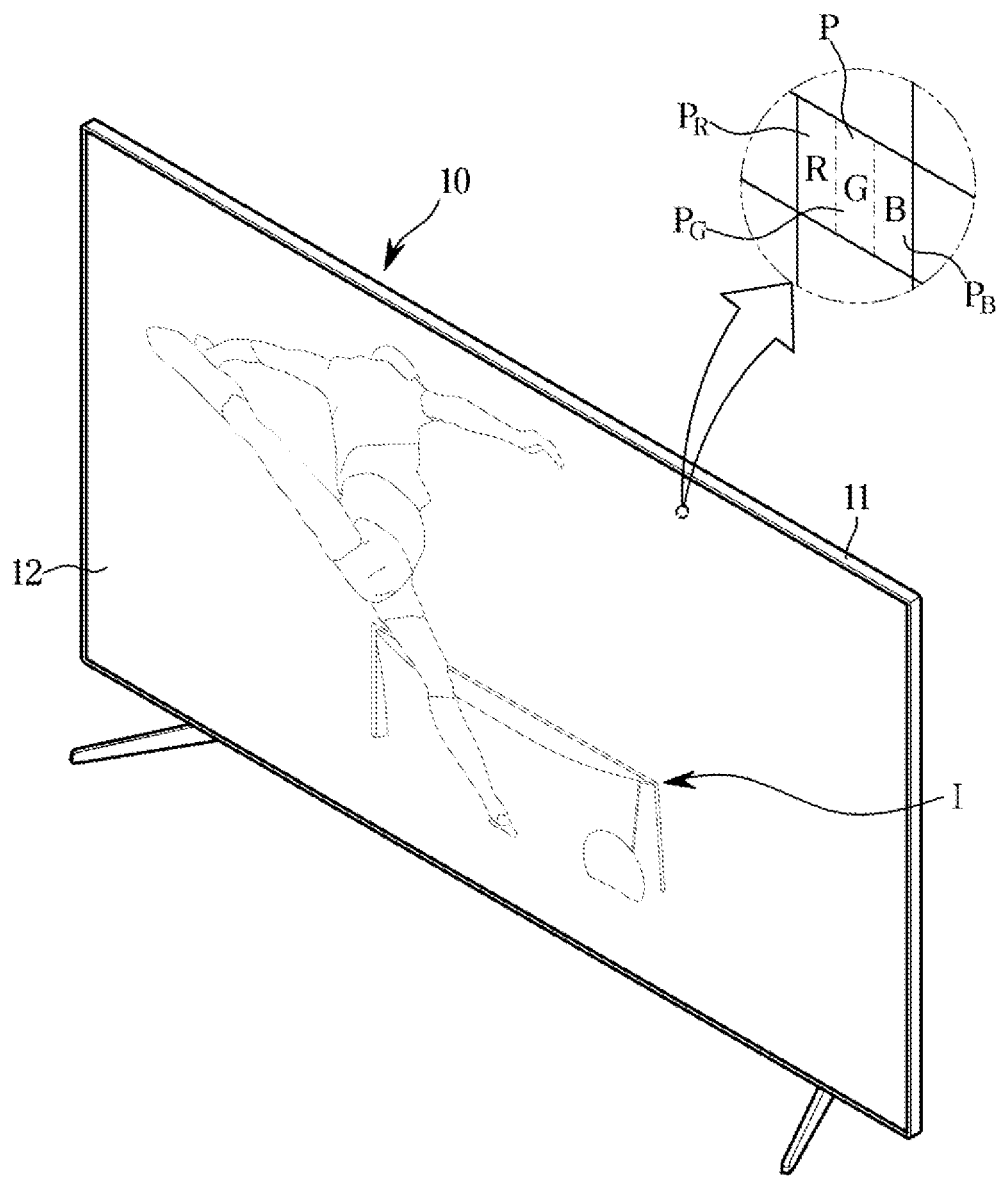
FIG. 1 illustrates an example of an exterior of a display apparatus, according to an embodiment.
Figure 1:
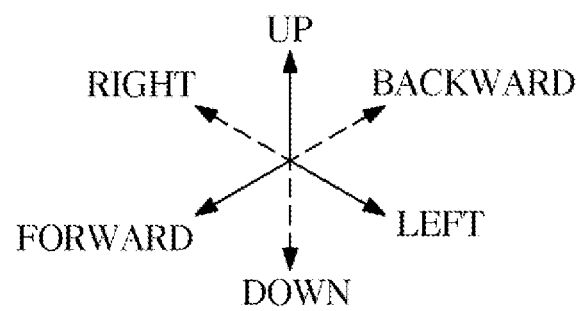

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art will recognize that various changes and modifications of the embodiments described herein may be made without departing from the scope and spirit of the disclosure. In addition, descriptions of well-known functions and structures are omitted for clarity and conciseness.

Terms used herein are only used to describe embodiments and are not intended to limit the present disclosure.

For example, as used herein, the singular expressions are intended to include plural forms as well, unless the context clearly dictates otherwise.

It should be understood that the terms "comprise" and/or "comprising," when used herein, specify the presence of stated features, integers, steps, operations, elements, components, or a combination thereof, but do not preclude the presence or addition of one or more features, integers, steps, operations, elements, components, or a combination thereof.

Terms containing ordinal numbers, such as "first," "second," etc., are used to distinguish one component from another and are not limited to the one component. The terms "upper," "middle", "lower", etc. may be replaced with terms, such as "first," "second," third" to be used to describe relative positions of elements. The terms "first," "second," third" may be used to described various elements but the elements are not limited by the terms and a "first element" may be referred to as a "second element". Alternatively or additionally, the terms "first", "second", "third", etc. may be used to distinguish components from each other and do not limit the present disclosure. For example, the terms "first", "second", "third", etc. may not necessarily involve an order or a numerical meaning of any form.

The terms "unit," "device," "block," "member," and "module" should be understood to mean a unit for processing at least one function or operation. For example, the terms may refer to at least one process processed by at least one hardware component such as a field-programmable gate array (FPGA) or an application specific integrated circuit (ASIC), at least one software component stored in a memory, or a processor.

It should be understood that when a member is "on" another member, this may include not only when the member is in contact with the other member, but also when there is another member between the two members.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

Hereinafter, embodiments of the present disclosure set forth herein will be described in detail with reference to the accompanying drawings. The same reference numerals or signs shown in the accompanying drawings denote components or elements that perform substantially the same functions.

FIG. 1 illustrates an example of an exterior of a display apparatus, according to an embodiment.

Referring to FIG. 1, a display apparatus 10 may be an apparatus capable of processing an image signal received from the outside (e.g., an external device over a wired and/or a wireless connection) and visually displaying the processed image signal. Hereinafter, an example of a case in which the display apparatus 10 is a television (TV) is described. However, the present disclosure is not limited thereto. For example, the display apparatus 10 may be implemented in various forms, such as, but not limited to, a monitor, a portable multimedia device, a portable communication device, and the like. Alternatively or additionally, the display apparatus 10 may not be limited in shape as long as images may be visually displayed thereby.

Alternatively or additionally, the display apparatus 10 may be a large format display (LFD) installed outdoors (e.g., on a roof of a building, a bus stop, a stadium, a park, a billboard). As described herein, the outdoors may not necessarily be limited to outdoor areas, and the display apparatus 10, according to an embodiment, may be installed in places where many people may transit through (e.g., subway stations, shopping malls, movie theaters, companies, retail store premises).

The display apparatus 10 may receive content, which may include video signals and/or audio signals, from various types of content sources. The display apparatus 10 may output video and/or audio data (e.g., visual information, images, sounds, spoken dialogue) corresponding to the video signals and/or the audio signals. For example, the display apparatus 10 may receive content data, through a broadcast reception antenna and/or a wired cable, from a content playback device and/or from a content providing server of a content provider.

As shown in FIG. 1, the display apparatus 10 may include a main body 11 and a screen 12 that displays an image I.

The main body 11 may form an exterior of the display apparatus 10. For example, components for allowing the display apparatus 10 to display the image I and/or performing various functions may be provided inside the main body 11. The main body 11 of FIG. 1 may have a flat plate shape. However, the shape of the main body 11 may not be limited to that shown in FIG. 1. For example, in an embodiment, the main body 11 may have a curved plate shape.

The screen 12 may be provided on a front surface of the main body 11 and may display the image I. For example, the screen 12 may display a still image and/or moving images. Alternatively or additionally, the screen 12 may display a two-dimensional (2D) image or display a three-dimensional (3D) image using a user's binocular disparity.

The screen 12 may include a liquid crystal panel that passes and/or blocks light emitted from a light apparatus or the like.

In an embodiment, a plurality of pixels P may be formed on the screen 12. That is, the image I displayed on the screen 12 may be formed by light emitted from each of the plurality of pixels P. For example, light emitted from the plurality of pixels P may be combined (e.g., in a mosaic pattern) to form the image I on the screen 12.

The plurality of pixels P may each emit light of various brightness levels and/or various colors. To emit light of various colors, the plurality of pixels P may each include subpixels $P_R$, $P_G$, and $P_B$.

The subpixels $P_R$, $P_G$, and $P_B$ may include a red subpixel $P_R$ that may emit a red light, a green subpixel $P_G$ that may emit a green light, and a blue subpixel $P_B$ that may emit a blue light. For example, the red light may have a wavelength ranging from approximately 700 nanometers (nm) (e.g., 700 billionths of a meter) to approximately 800 nm. The green light may have a wavelength of approximately 500 nm to approximately 600 nm. The blue light may have a wavelength of approximately 400 nm to approximately 500 nm.

Light of various brightness levels and/or colors may be emitted from each of the plurality of pixels P by combining the red light emitted from the red subpixel $P_R$, the green light emitted from the green subpixel $P_G$, and the blue light emitted from the blue subpixel $P_B$.

Figure 2:
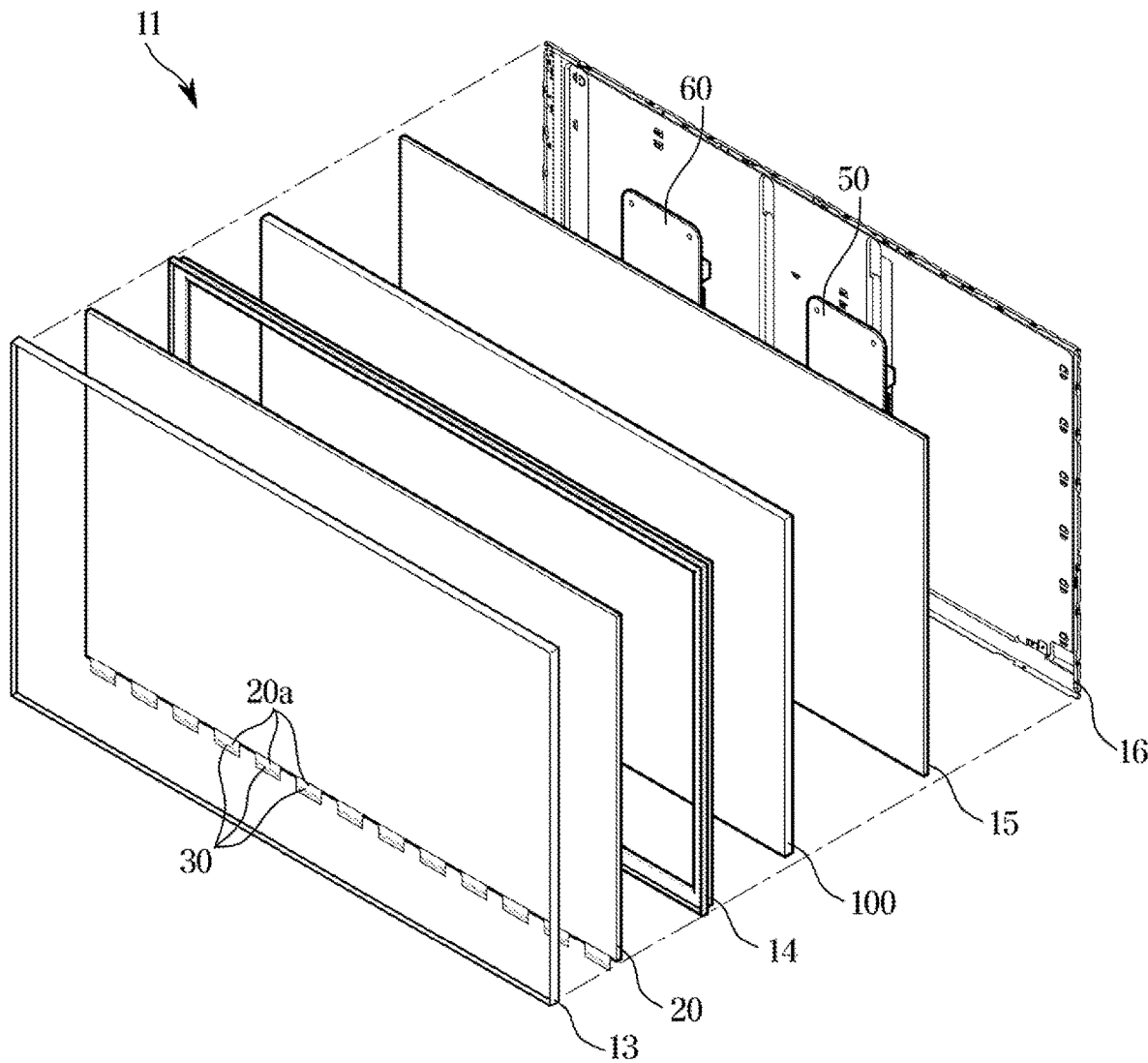
FIG. 2 illustrates an example of a structure of a display apparatus, according to an embodiment.
Figure 2:
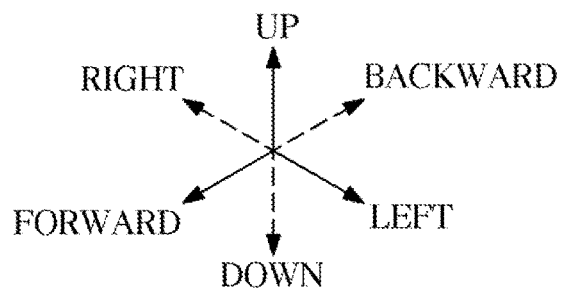
Figure 3:
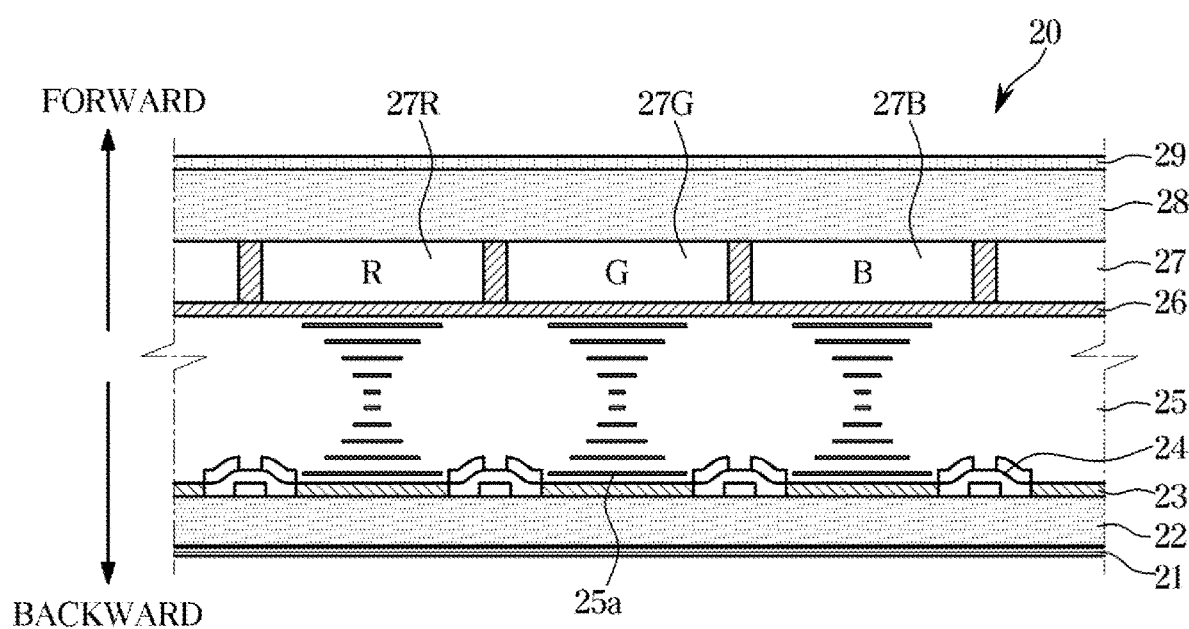
FIG. 3 illustrates an example of a liquid crystal panel included in a display apparatus, according to an embodiment.

FIG. 2 illustrates an example of a structure of a display apparatus, according to an embodiment. FIG. 3 illustrates an example of a liquid crystal panel included in a display apparatus, according to an embodiment.

Referring to FIG. 2, various components for generating an image I on a screen 12 may be provided inside a main body 11.

For example, the main body 11 may include a light apparatus 100 that may be a surface light source, a liquid crystal panel 20 that may block and/or pass light emitted from the light apparatus 100, a control assembly 50 that may control operations of the light apparatus 100 and the liquid crystal panel 20, and a power assembly 60 that may supply power to the light apparatus 100 and the liquid crystal panel 20. Alternatively or additionally, the main body 11 may further include a bezel 13, a frame middle mold 14, a bottom chassis 15, and a rear cover 16 to support the liquid crystal panel 20, the light apparatus 100, the control assembly 50, and the power assembly 60.

The light apparatus 100 may include a point light source that may emit white light. The light apparatus 100 may refract, reflect, and/or scatter the light emitted from the point light source into an uniform surface light. That is, the light apparatus 100 may emit the uniform surface light in a forward direction by refracting, reflecting, and/or scattering the light emitted from the point light source.

The liquid crystal panel 20 may be provided in front of the light apparatus 100. The liquid crystal panel 20 may block and/or pass the light emitted from the light apparatus 100 to form an image I.

A front surface of the liquid crystal panel 20 may form the screen 12 of the display apparatus 10. The liquid crystal panel 20 may include a plurality of pixels P, as described above with reference to FIG. 1. That is, the plurality of pixels P of the liquid crystal panel 20 may independently block and/or pass the light emitted from the light apparatus 100. In this manner, light passing through the plurality of pixels P may form the image I that may be displayed on the screen 12.

For example, as shown in FIG. 3, the liquid crystal panel 20 may include a first polarizing film 21, a first transparent substrate 22, a pixel electrode 23, a thin-film transistor (TFT) 24, a liquid crystal layer 25, a common electrode 26, a color filter 27, a second transparent substrate 28, and a second polarizing film 29.

The first transparent substrate 22 and the second transparent substrate 28 may fixedly support the pixel electrode 23, the TFT 24, the liquid crystal layer 25, the common electrode 26, and the color filter 27. In an embodiment, the first and second transparent substrates 22 and 28 may be formed of tempered glass and/or a transparent resin. However, the present disclosure is not limited in this regard. For example, the first and second transparent substrates 22 and 28 may be formed of other materials and/or combinations of materials without departing from the scope of the present disclosure.

Continuing to refer to FIG. 3, the first polarizing film 21 and the second polarizing film 29 may be provided on outer sides of the first and second transparent substrates 22 and 28, respectively. The first polarizing film 21 and the second polarizing film 29 may pass a specific type of polarized light and block (e.g., reflect and/or absorb) other types of polarized light. For example, the first polarizing film 21 may pass polarized light in a first direction and block (reflect or absorb) other types of polarized light. Alternatively or additionally, the second polarizing film 29 may pass polarized light in a second direction and block (reflect or absorb) other types of polarized light. In an embodiment, the first direction and the second direction may be perpendicular to each other. That is, the polarized light passing through the first polarizing film 21 may not directly pass through the second polarizing film 29.

The color filter 27 may be provided inside the second transparent substrate 28. For example, the color filter 27 may include a red filter 27R that may pass red light, a green filter 27G that may pass green light, and a blue filter 27B that may pass blue light. In an embodiment, the red filter 27R, the green filter 27G, and the blue filter 27B may be arranged in parallel. An area occupied by the color filter 27 may correspond to the pixels P described above with reference to FIG. 1. For example, an area occupied by the red filter 27R may correspond to a red subpixel $P_R$, an area occupied by the green filter 27G may correspond to a green subpixel $P_G$, and an area occupied by the blue filter 27B may correspond to a blue subpixel $P_B$.

In an embodiment, the pixel electrode 23 may be provided inside the first transparent substrate 22. Alternatively or additionally, the common electrode 26 may be provided inside the second transparent substrate 28. The pixel electrode 23 and the common electrode 26 may be formed of a metal material through which electricity flows. Alternatively or additionally, the pixel electrode 23 and the common electrode 26 may generate an electric field for changing an arrangement of liquid crystal molecules 25a constituting the liquid crystal layer 25.

The TFT 24 may be provided inside the second transparent substrate 22. The TFT 24 may be turned on (e.g., closed state) and/or turned off (e.g., opened state) by image data provided from a panel driver 30. As the TFT 24 is turned on (e.g., closed) and/or turned off (e.g., opened), the electric field may be formed on and/or removed from the pixel electrode 23 and the common electrode 26.

The liquid crystal layer 25 may be formed between the pixel electrode 23 and the common electrode 26. Alternatively or additionally, the liquid crystal layer 25 may be filled with the liquid crystal molecules 25a. The liquid crystal molecules 25a may be in an intermediate state between a solid (e.g., a crystal) and a liquid. As such, the liquid crystal molecules 25a may exhibit optical properties according to a change in the electric field applied to the liquid crystal molecules 25a. For example, a direction of the arrangement of the liquid crystal molecules 25a may change according to a change in the electric field. Consequently, the optical properties of the liquid crystal layer 25 may be changed according to whether there is an electric field passing through the liquid crystal layer 25. That is, the liquid crystal layer 25 may cause a polarization direction of light to be rotated about an optical axis according to whether there is an electric field. For example, the liquid crystal layer 25 may rotate the polarization direction of light when an electric field is applied to the liquid crystal layer 25 and/or may not rotate a polarization direction of light when an electric field is not applied. Alternatively or additionally, the liquid crystal layer 25 may rotate the polarization direction of light when an electric field is not applied to the liquid crystal layer 25 and/or may not rotate a polarization direction of light when an electric field is applied. Accordingly, a polarization direction of polarized light passing through the first polarizing film 21 may be rotated as the polarized light passes through the liquid crystal layer 25. As a result, the polarized light may pass through the second polarizing film 29.

Returning to FIG. 2, a cable 20a may be provided at a side of the liquid crystal panel 20. The cable 20a may transmit image data to the liquid crystal panel 20 and/or a display driver integrated circuit (DDI) (hereinafter referred to as 'panel driver') 30. The panel driver 30 may process digital image data and may output a corresponding analog image signal.

The cable 20a may electrically connect (e.g., couple) the control assembly 50 and/or the power assembly 60 and the panel driver 30. Alternatively or additionally, the cable 20a may electrically connect the panel driver 30 and the liquid crystal panel 20. In an embodiment, the cable 20a may include a flexible flat cable, a film cable, or the like. In an optional or additional embodiment, the cable 20a may include a bendable cable.

The panel driver 30 may receive, through the cable 20a, image data and/or power from the control assembly 50 and/or the power assembly 60. Alternatively or additionally, the panel driver 30, through the cable 20a, may provide image data and/or a driving current to the liquid crystal panel 20.

In an embodiment, the cable 20a and the panel driver 30 may be implemented together as a film cable, a chip-on-film (COF), a tape carrier package (TCP), or the like. That is, the panel driver 30 may be provided on the cable 20a. However, the present disclosure is not limited thereto. For example, the panel driver 30 may be provided on the liquid crystal panel 20.

The control assembly 50 may include a control circuit for controlling operations of the liquid crystal panel 20 and/or the light apparatus 100. For example, the control circuit may process a video signal and/or an audio signal received from an external content source. Alternatively or additionally, the control circuit may transmit image data to the liquid crystal panel 20 and/or transmit dimming data to the light apparatus 100.

The power assembly 60 may include a power circuit for supplying power to the liquid crystal panel 20 and/or the light apparatus 100. Alternatively or additionally, the power circuit may supply power to the control assembly 50, the light apparatus 100, and/or the liquid crystal panel 20.

In an embodiment, the control assembly 50 and the power assembly 60 may be implemented as a printed circuit board (PCB) and/or as various types of circuits mounted on the PCB. For example, the power circuit may include, but not be limited to, a capacitor, a coil, a resistor, a processor, and the like, and/or a power circuit board on which they are mounted. In an optional or additional embodiment, the control circuit may include a memory, a processor, and/or a control circuit board on which the memory and/or the processor are mounted.

Figure 4:
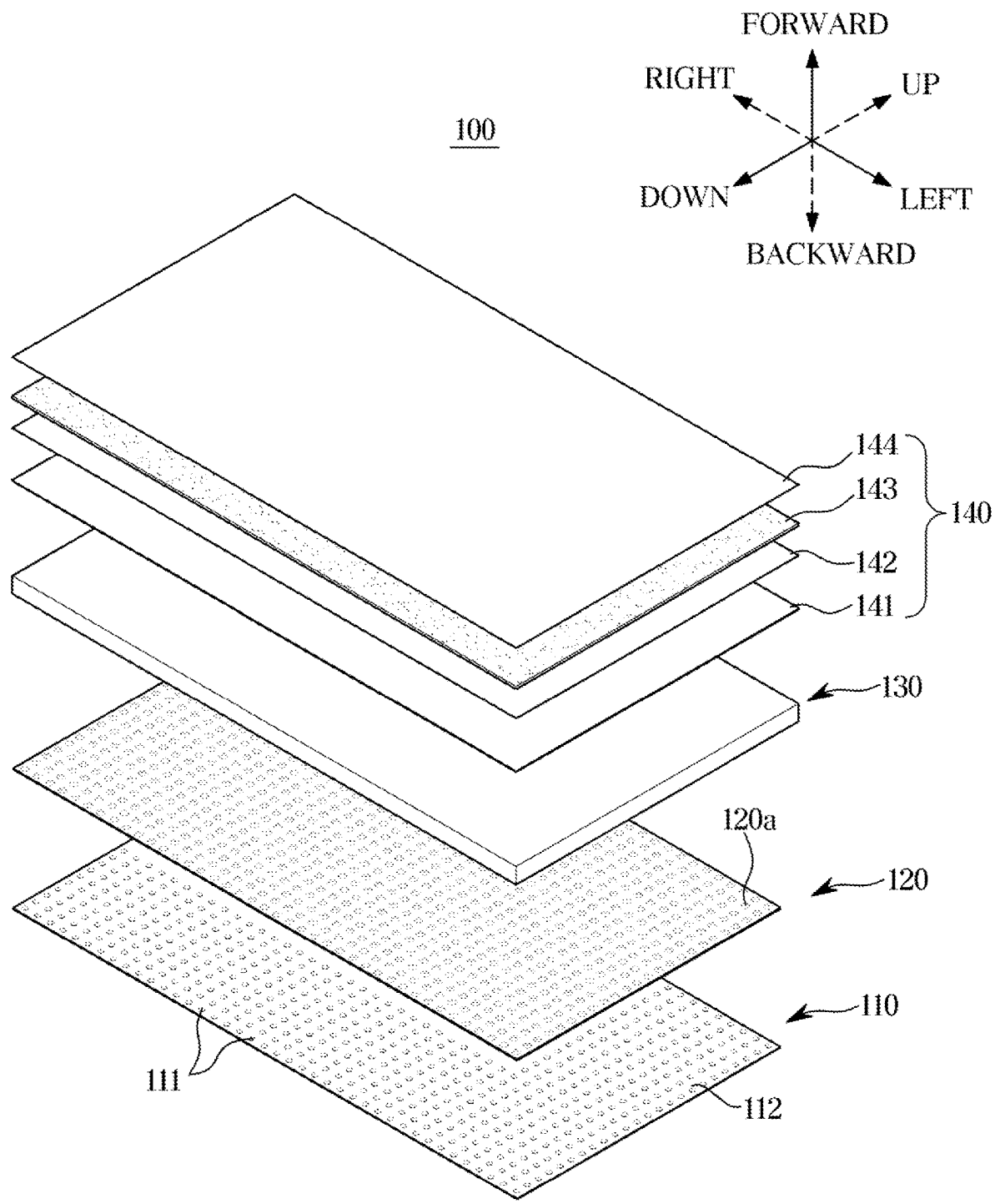
FIG. 4 illustrates an example of a light apparatus included in a display apparatus, according to an embodiment.
Figure 5:
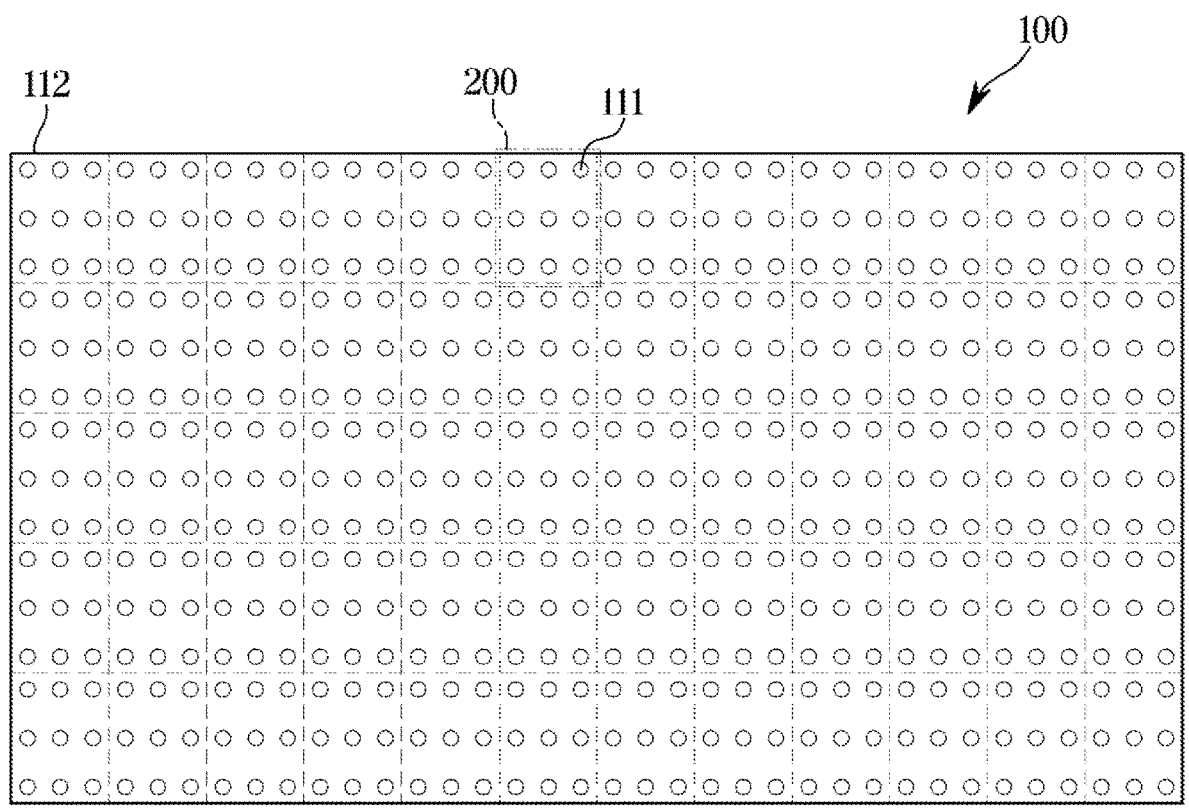
FIG. 5 is a diagram for describing division of a plurality of light sources into a plurality of dimming blocks, according to an embodiment.

FIG. 4 is a diagram illustrating an example of a light apparatus 100 included in a display apparatus, according to an embodiment. FIG. 5 is a diagram for describing division of a plurality of light sources into a plurality of dimming blocks, according to an embodiment.

Referring to FIG. 4, the light apparatus 100 may include a light source module 110 that may generate light, a reflective sheet 120 that may reflect light, a diffuser plate 130 that may uniformly diffuse light, and an optical sheet 140 that may increase the luminance of emitted light.

The light source module 110 may include a plurality of light sources 111 that may emit light and a substrate 112 that may fixedly support the plurality of light sources 111.

The plurality of light sources 111 may be disposed in a predetermined pattern so that light at a uniform luminance level may be emitted. In an embodiment, the plurality of light sources 111 may be disposed such that each light source may be spaced the same distance from light sources adjacent thereto.

For example, as shown in FIG. 4, the plurality of light sources 111 may be arranged in rows and columns. Alternatively or additionally, the plurality of light sources 111 may be disposed such that four adjacent light sources form an approximately square shape. In an embodiment, one light source that may be disposed adjacent to four light sources may be spaced approximately the same distance from the four adjacent light sources.

According to an optional or additional embodiment, the plurality of light sources 111 may be arranged such that three adjacent light sources may form an approximately regular triangle. In such an embodiment, one light source may be disposed adjacent to six light sources. Alternatively or additionally, the one light source may be spaced approximately the same distance from the six adjacent light sources.

However, the arrangement of the plurality of light sources 111 is not limited to the above-described arrangements, and the plurality of light sources 111 may be arranged in various forms such that light may be emitted with a uniform luminance level.

The light sources 111 may each employ an element that emits monochromatic light (e.g., light of a specific wavelength, such as, but not limited to, a blue light) in various directions when power is supplied thereto. Alternatively or additionally, the light sources 111 may each employ an element that emits white light (e.g., mixed light of red light, green light, and blue light) when power is supplied thereto. For example, the light sources 111 may each include a light-emitting diode (LED). The LED may be implemented in various sizes and may include, but not be limited to, a mini LED, a Micro LED, an organic LED (OLED), a polymer LED (PLED), or the like.

The substrate 112 may fix the plurality of light sources 111 so that the positions of the light sources 111 may not be changed. Alternatively or additionally, the substrate 112 may supply power to the light sources 111 such that the light sources 111 may emit light.

The substrate 112 may include, but not be limited to, a synthetic resin, tempered glass, and/or a PCB, for fixing the plurality of light sources 111 to respective positions. Alternatively or additionally, the substrate 112 may be provided with a conductive power supply line for supplying power to the light sources 111.

Various types of wires may be formed on the substrate 112 to supply power to the light sources 111. For example, in order to form the various types of wires on the substrate 112, the PCB may be formed with a plurality of layers.

The reflective sheet 120 may reflect the light emitted from the plurality of light sources 111 in a forward direction and/or a direction similar to the forward direction.

A plurality of through-holes 120a may be formed on the reflective sheet 120 at positions corresponding to the plurality of light sources 111 of the light source module 110. In an embodiment, the plurality of light sources 111 of the light source module 110 may protrude from a front surface of the reflective sheet 120 while passing through the plurality of through-holes 120a.

For example, the plurality of light sources 111 of the light source module 110 may be inserted into the plurality of through-holes 120a in the reflective sheet 120 during the assembly of the reflective sheet 120 and the light source module 110. As a result, the substrate 112 of the light source module 110 may be located behind the reflective sheet 120, and a plurality of light sources 111 of the light source module 110 may be located in front of the reflective sheet 120.

Accordingly, the plurality of light sources 111 may emit light in front of the reflective sheet 120.

The plurality of light sources 111 may emit light in various directions in front of the reflective sheet 120. For example, light from the light sources 111 may be emitted toward the diffuser plate 130 and/or toward the reflective sheet 120. Alternatively or additionally, the reflective sheet 120 may reflect the light, which has been emitted toward the reflective sheet 120, toward the diffuser plate 130.

In an embodiment, light emitted from the light sources 111 may pass through various objects such as, but not limited to, the diffuser plate 130 and/or the optical sheet 140. For example, when the light passes through the diffuser plate 130 and the optical sheet 140, some incident light may be reflected from the surfaces of the diffuser plate 130 and the optical sheet 140. For another example, the reflective sheet 120 may reflect the light reflected from the diffuser plate 130 and the optical sheet 140.

The diffuser plate 130 may be provided in front of the light source module 110 and the reflective sheet 120. In an embodiment, the diffuser plate 130 may uniformly distribute the light emitted from the plurality of light sources 111 of the light source module 110.

As described above, the plurality of light sources 111 may be provided on various locations on a rear surface of the light apparatus 100. Although the plurality of light sources 111 may be disposed on the rear surface of the light apparatus 100 at equal intervals, uneven luminance may occur according to the positions of the plurality of light sources 111.

The diffuser plate 130 may diffuse light, which may have been emitted from the plurality of light sources 111, to eliminate uneven luminance due to the plurality of light sources 111. That is, the diffuser plate 130 may uniformly emit, in the forward direction, light with non-uniform luminance from the plurality of light sources 111.

In an embodiment, the optical sheet 140 may include various types of sheets to improve luminance and the uniformity of the luminance. For example, the optical sheet 140 may include a diffuser sheet 141, a first prism sheet 142, a second prism sheet 143, a reflective polarizing sheet 144, and the like.

The diffuser sheet 141 may diffuse light to achieve an even luminance. In an embodiment, light emitted from the light sources 111 may be diffused by the diffuser plate 130 and diffused again by the diffuser sheet 141 included in the optical sheet 140.

The first and second prism sheets 142 and 143 may increase luminance by condensing the light diffused by the diffuser sheet 141. For example, the first and second prism sheets 142 and 143 may each include a triangular prism pattern. Alternatively or additionally, the first and second prism sheets 142 and 143 may each include a plurality of triangular prism patterns that may be arranged adjacent to each other to form multiple band shapes.

The reflective polarizing sheet 144 may be a type of polarizing film. In embodiment, the reflective polarizing sheet 144 may transmit at least a portion of light incident thereon and/or may reflect the remaining light to increase luminance. For example, light polarized in the same direction as a predetermined polarization direction of the reflective polarizing sheet 144 may be transmitted, and light polarized in a direction different from the predetermined polarization direction of the reflective polarizing sheet 144 may be reflected. In an embodiment, the light reflected from the reflective polarizing sheet 144 may be recycled inside the light apparatus 100, and the luminance of the display apparatus 10 may be increased due to the light recycling.

The optical sheet 140 may not be limited to the sheets and/or films shown in FIG. 4, and may include any of various types of sheets or films such as a protective sheet.

The light apparatus 100 may include the plurality of light sources 111, and may output surface light by diffusing light emitted from the plurality of light sources 111. The liquid crystal panel 20 may include a plurality of pixels and control the plurality of pixels to pass and/or block the light. An image may be formed by light passing through the plurality of pixels.

In an embodiment, the display apparatus 10 may perform local dimming by differently setting the brightness of light for each region of the light apparatus 100 in connection with an output image so as to reduce power consumption while increasing a contrast ratio.

For example, the display apparatus 10 may decrease the brightness of a light source 111 of the light apparatus 100 corresponding to a dark part of the image to make the dark part darker. Alternatively or additionally, the apparatus 10 may increase the brightness of the light source 111 of the light apparatus 100 corresponding to a light part of the image to make the light part brighter. Therefore, a contrast ratio and/or a brightness ratio of the image may be increased.

In an embodiment, the display apparatus 10 may divide the light apparatus 100 into a plurality of blocks, and may independently adjust the amount of current for each of the blocks according to an input image. That is, the display apparatus 10 may output and/or transmit an image by a local dimming driving method for each frame, in which the driving of a current may be adjusted according to the number of blocks in the light apparatus 100.

Consequently, the display apparatus 10 may reduce the amount of current to be supplied to a dimming block corresponding to a dark region of an input image and/or may increase the amount of current to be supplied to a dimming block corresponding to a bright region of the input image, thereby effectively improving a contrast ratio.

For local dimming, the plurality of light sources 111 included in the light apparatus 100 may be divided into a plurality of dimming blocks 200. For example, the plurality of dimming blocks 200 may be a total of sixty (60) dimming blocks arranged in five rows and twelve columns as shown in FIG. 5. However, the number of the plurality of dimming blocks 200 is not limited thereto.

Referring to FIG. 5, each of the plurality of dimming blocks 200 may include at least one light source 111. In an embodiment, the light apparatus 100 may supply the same amount of driving current to the light sources 111 belonging to the same dimming block 200. Consequently, the light sources 111 belonging to the same dimming block 200 may emit light of a substantially similar and/or the same brightness level.

In an optional or additional embodiment, the light apparatus 100 may supply different amounts of the driving current to the light sources 111 belonging to different dimming blocks 200 according to dimming data. Consequently, the light sources 111 belonging to the different dimming blocks 200 may emit light of different brightness levels.

Each of the plurality of dimming blocks 200 may include, for example, N×M light sources arranged in an N×M matrix, where N and M are positive integers greater than zero (0). For example, the N×M matrix may refer to a matrix with N rows and M columns.

Because each of the light sources 111 includes an LED, each of the plurality of dimming blocks 200 may include N×M LEDs. According to various embodiments, each of the light sources 111 may further include an optical dome covering the LED. In an embodiment, the optical dome may cover at least a portion of the LED. The optical dome may prevent and/or suppress damage to the LED due to an external mechanical action, a chemical action, and/or an electrical action.

The light apparatus 100 may be formed to be relatively thin in order to potentially reduce a thickness of the display apparatus 10. That is, the thickness of the light apparatus 100 may be reduced by reducing a thickness of each of the plurality of light sources 111 and/or by simplifying a structure thereof.

In an embodiment, the LED of light source 111 may be directly attached onto the substrate 112 by a chip-on board (COB) method. For example, the light source 111 may include an LED 190 which may be a LED chip and/or an LED die on which additional packaging may not have been performed and which may be directly attached onto the substrate 112.

In an optional or additional embodiment, the LED of the light source 111 may be manufactured as a flip chip type. For example, when a flip chip type LED (e.g., a semiconductor element) is attached onto the substrate 112, an electrode pattern of the semiconductor element may be directly fused on the substrate 112 without using an intermediate medium such as, but not limited to, a metal lead (wire) or a ball grid array (BGA). Consequently, the size of the light source 111, including the flip chip type LED, may be minimized due to the omission of the metal lead (e.g., wire) and/or the ball grid array.

A flip chip type LED 190 that may be directly fused on the substrate 112 by the COB method has been described above. However, the light source 111 may not be limited thereto. For example, the light source 111 may include other types of LEDs, such as, but not limited to, a package type LED.

In an embodiment, the plurality of dimming blocks 200 may be disposed on the substrate 112. That is, N×M LEDs may be disposed on the substrate 112, for example.

Figure 6:
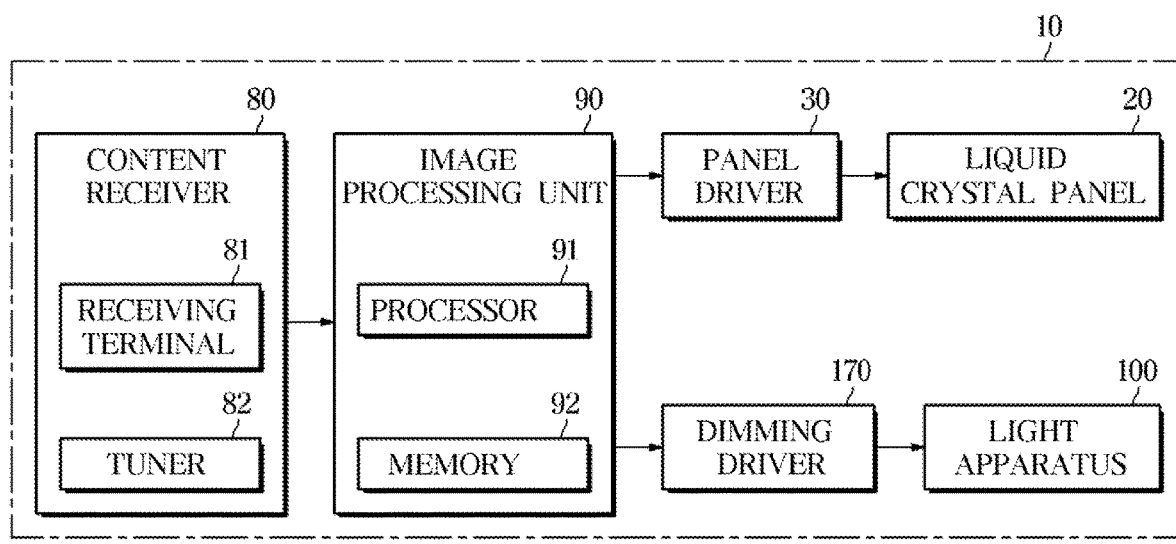
FIG. 6 is a control block diagram of a display apparatus, according to an embodiment.

FIG. 6 is a control block diagram of a display apparatus, according to an embodiment.

Referring to FIG. 6, the display apparatus 10 may include a content receiver 80, an image processing unit 90, a panel driver 30, a liquid crystal panel 20, a dimming driver 170, and a light apparatus 100.

The content receiver 80 may include a receiving terminal 81 for receiving content including a video signal and/or an audio signal from content sources, and a tuner 82.

For example, the receiving terminal 81 may receive a video signal and/or an audio signal from the content sources through a cable. Examples of the receiving terminal 81 may include a component (e.g., YPbPr, RGB) terminal, a composite video blanking and sync (CVBS) terminal, an audio terminal, a high-definition multimedia interface (HDMI) terminal, a universal serial bus (USB) terminal, and the like.

The tuner 82 may receive a broadcast signal from a broadcast receiving antenna and/or a wired cable. Alternatively or additionally, the tuner 82 may extract a broadcast signal of a channel selected by a user from among broadcast signals. For example, the tuner 82 may pass a broadcast signal of a frequency corresponding to a channel selected by a user among a plurality of broadcast signals received through a broadcast receiving antenna and/or a wired cable, and/or block broadcast signals of different frequencies.

In an embodiment, the content receiver 80 may receive a video signal and/or an audio signal from content sources through the receiving terminal 81 and/or the tuner 82. Alternatively or additionally, the content receiver 80 may output, to the image processing unit 90, the video signal and/or the audio signal received through the receiving terminal 81 and/or the tuner 82.

The image processing unit 90 may include a processor 91 that processes image data, and a memory 92 that records and/or stores a program and/or data for processing image data.

The memory 92 may store a program and/or data for processing a video signal and/or an audio signal. Alternatively or additionally, the memory 92 may temporarily store data generated during the processing of the video signal and/or the audio signal.

The memory 92 may include a nonvolatile memory such as, but not limited to, a read-only memory (ROM), a flash memory, and the like. Alternatively or additionally, the memory 92 may include a volatile memory such as, but not limited to, a static random-access memory (SRAM), a dynamic RAM (DRAM), and the like.

In an embodiment, the processor 91 may receive a video signal and/or an audio signal from the content receiver 80. The processor 91 may decode the video signal into image data. In an optional or additional embodiment, the processor 91 may generate dimming data from the image data. Alternatively or additionally, the processor 91 may output the image data and/or the dimming data to the panel driver 30 and/or the dimming driver 170, respectively.

In an embodiment, the image processing unit 90 may generate image data and/or dimming data from a video signal obtained by the content receiver 80. Alternatively or additionally, the image processing unit 90 may transmit the image data and/or the dimming data to the liquid crystal panel 20 and/or the light apparatus 100, respectively.

The image data may include information about the intensity of the light emitted by each of a plurality of pixels (or a plurality of subpixels) included in the liquid crystal panel 20. In an embodiment, the image data may be provided to the liquid crystal panel 20 via the panel driver 30.

The liquid crystal panel 20 may include the plurality of pixels for transmitting and/or blocking light. In an embodiment, the plurality of pixels are arranged in a matrix. That is, the plurality of pixels may be arranged in rows and columns (e.g., N rows×M columns).

The panel driver 30 may receive image data from the image processing unit 90. In an embodiment, the panel driver 30 may drive the liquid crystal panel 20 according to the image data. That is, the panel driver 30 may convert the image data (hereinafter referred to as digital image data), which may be a digital signal, into an analog image signal, which may be an analog voltage signal. The panel driver 30 may provide the analog image signal to the liquid crystal panel 20. In an optional or additional embodiment, the optical properties (e.g., light transmittance) of the plurality of pixels of the liquid crystal panel 20 may be changed by the analog image signal.

The panel driver 30 may include, for example, a timing controller, a data driver, a scan driver, and the like.

The timing controller of the panel driver 30 may receive image data from the image processing unit 90. The timing controller may output the image data and/or a driving control signal to the data driver and/or the scan driver. The driving control signal may include a scan control signal and/or a data control signal. The scan control signal and/or the data control signal may be used to control an operation of the scan driver and/or an operation of the data driver, respectively.

The scan driver of the panel driver 30 may receive the scan control signal from the timing controller of the panel driver 30. The scan driver may activate an input in one of the rows in the liquid crystal panel 20 according to the scan control signal. That is, the scan driver may transition (e.g., activate) pixels included in one of the plurality of pixels arranged in rows and columns into a state for receiving an analog image signal. As such, pixels other than the pixels whose input is activated by the scan driver may not receive the analog image signal.

The data driver of the panel driver 30 may receive image data and/or a data control signal from the timing controller of the panel driver 30. The data driver may output the image data to the liquid crystal panel 20 according to the data control signal. For example, the data driver may receive digital image data from the timing controller. The data driver may convert the digital image data into an analog image signal. Alternatively or additionally, the data driver may provide the analog image signal to the pixels included in the row whose input is activated by the scan driver. Consequently, the pixels whose input is activated by the scan driver may receive the analog image signal. In an embodiment, the optical properties (e.g., light transmittance) of the pixels whose input has been activated may be changed by the received analog image signal.

In an embodiment, the panel driver 30 may drive the liquid crystal panel 20 according to the image data. Accordingly, an image corresponding to the image data may be displayed on the liquid crystal panel 20.

The dimming data may include information about the intensity of light emitted from each of the plurality of light sources (or the plurality of dimming blocks) included in the light apparatus 100. In an embodiment, the dimming data may be provided to the light apparatus 100 via the dimming driver 170.

The light apparatus 100 may include a plurality of light sources 111 that may emit light. The plurality of light sources 111 may be arranged in a matrix. That is, the plurality of light sources 111 may be disposed in rows and columns (e.g., N rows×M columns).

The light apparatus 100 may be divided into the plurality of dimming blocks 200. Each of the plurality of dimming blocks 200 may include at least one light source.

The light apparatus 100 may output surface light by diffusing light emitted from the plurality of light sources 111. The liquid crystal panel 20 may include the plurality of pixels and control the plurality of pixels to pass and/or block the light. An image may be formed by light passing through the plurality of pixels.

In an embodiment, the light apparatus 100 may turn off light sources corresponding to a dark region of the image to make the dark region darker. Accordingly, the dark region of the image may become darker, thus potentially improving a contrast ratio of the image. Alternatively or additionally, the light apparatus 100 may turn on light sources corresponding to a light (e.g., bright) region of the image to make the light region brighter. Accordingly, the light region of the image may become brighter, thus potentially further improving the contrast ratio of the image The operation of controlling of the plurality of light sources by the light apparatus 100 to emit light in a region corresponding to a bright region of the image and not to emit light in a region corresponding to a dark region of the image may be referred to as local dimming.

For local dimming, the plurality of light sources 111 included in the light apparatus 100 may be divided into the plurality of dimming blocks 200 as shown in FIG. 5. Although FIG. 5 illustrates a total of sixty dimming blocks 200 arranged in five rows and twelve columns, the number and/or arrangement of the plurality of dimming blocks 200 is not limited to the example shown in FIG. 5. That is, the number and/or arrangement of the plurality of dimming blocks 200 may be varied without departing from the scope of the present disclosure.

In an embodiment, the plurality of dimming blocks 200 may each include at least one light source. In an optional or additional embodiment, the light apparatus 100 may supply the same amount of driving current to light sources 111 belonging to the same dimming block 200. Consequently, the light sources 111 belonging to the same dimming block 200 may emit light of the same brightness level. For example, light sources belonging to the same dimming block may be connected in series with each other, so that the same amount of driving current may be supplied to the light sources belonging to the same dimming block.

The light apparatus 100 may further include a plurality of driving devices 300 that control a driving current supplied to the light sources included in each of the plurality of dimming blocks 200. Each of the driving devices 300 may be provided to correspond to at least one of the plurality of dimming blocks 200. That is, the plurality of driving devices 300 may drive the plurality of dimming blocks 200.

In an embodiment, when the light sources belonging to the dimming block are connected in series, the light sources included in the dimming block may operate together and may integrally form a light source block.

Thus, the phrase "supplying a driving current to the dimming block" may be interpreted as having the same meaning as "supplying the driving current to the light sources included in the dimming block."

Although FIG. 5 illustrates dimming blocks that each include nine light sources, the number and/or arrangement of the light sources included in each of the dimming blocks may not be limited to the example illustrated in FIG. 5. That is, the number and/or arrangement of the light sources included in each of the plurality of dimming blocks 200 may be varied without departing from the scope of the present disclosure.

In an embodiment, the image processing unit 90 may provide dimming data for performing local dimming on the light apparatus 100. The dimming data may include information about the luminance of each of the plurality of dimming blocks 200. For example, the dimming data may include information about the intensity of light output from the light sources included in each of the plurality of dimming blocks 200.

In an embodiment, the image processing unit 90 may obtain dimming data from the image data. For example, the image processing unit 90 may convert the image data into dimming data in at least one of various ways. For example, the image processing unit 90 may divide an image I, according to the image data, into a plurality of image blocks. In an embodiment, the number of the plurality of image blocks may be the same as the number of the plurality of dimming blocks 200. That is, each image block of the plurality of image blocks may correspond to a dimming block of the plurality of dimming blocks 200.

In an optional or additional embodiment, the image processing unit 90 may obtain luminance values of the plurality of dimming blocks 200 from the image data of the plurality of dimming blocks 200. Alternatively or additionally, the image processing unit 90 may generate dimming data by combining the luminance values of the plurality of dimming blocks 200.

In an optional or additional embodiment, the image processing unit 90 may obtain a luminance value of each of the plurality of dimming blocks 200 based at least on a maximum value among luminance values of pixels included in each of the image blocks.

One image block may include a plurality of pixels, and image data of the image block may include image data (e.g., red data, green data, blue data, and the like) of the plurality of pixels. For example, image processing unit 90 may calculate a luminance value of each of pixels based at least on the image data of each of the pixels.

In an embodiment, the image processing unit 90 may determine a maximum value among the luminance values of the pixels included in the image block as the luminance value of the dimming block corresponding to the image block. For example, the image processing unit 90 may set a maximum value among luminance values of pixels included in an $i^{th}$ image block as a luminance value of an $i^{th}$ dimming block. Alternatively or additionally, the image processing unit 90 may set a maximum value of luminance values of pixels included in a $j^{th}$ image block as a luminance value of a $j^{th}$ dimming block.

In an embodiment, the image processing unit 90 may generate dimming data by combining the luminance values of the plurality of dimming blocks 200.

Continuing to refer to FIG. 6, the dimming driver 170 may receive dimming data from the image processing unit 90. The dimming driver 170 may drive the light apparatus 100 according to the dimming data. For example, the dimming data may include information about the luminance of each of the plurality of dimming blocks 200 and/or information about the brightness of each light source included in each of the plurality of dimming blocks 200.

In an embodiment, the dimming driver 170 may convert dimming data, which may be a digital voltage signal, into an analog driving current.

Alternatively or additionally, the dimming driver 170 may sequentially provide an analog dimming signal to each of the driving devices 300 corresponding to the dimming blocks 200 by using an active matrix method, for example.

In an embodiment, the plurality of dimming blocks 200 may be divided into a plurality of groups. A driving current may be simultaneously supplied to the dimming blocks belonging to a same group. Alternatively or additionally, the driving current may be sequentially supplied to the dimming blocks belonging to different groups at different times. For example, the dimming driver 170 may activate dimming blocks belonging to one of a plurality of groups and provide an analog dimming signal to the activated dimming blocks. Thereafter, the dimming driver 170 may activate dimming blocks belonging to another group and provide the analog dimming signal to the activated dimming blocks.

In an example embodiment, dimming blocks in the same row may belong to the same group and/or dimming blocks in different rows may belong to different groups. However, such a classification method of groups may not be limited thereto. That is, the plurality of dimming blocks 200 may be classified into different groups than the classifications described above without departing from the scope of the present disclosure.

In an embodiment, a driving circuit of each of the dimming blocks 200 may provide an analog driving current corresponding to the analog dimming signal to the light source module 110. The light sources 111 included in the light source module 110 may emit light according to the analog driving current. Light sources belonging to the same dimming block may emit light of the same intensity according to dimming data. Light sources belonging to different dimming blocks may emit light of different intensities according to the dimming data.

Figure 7:
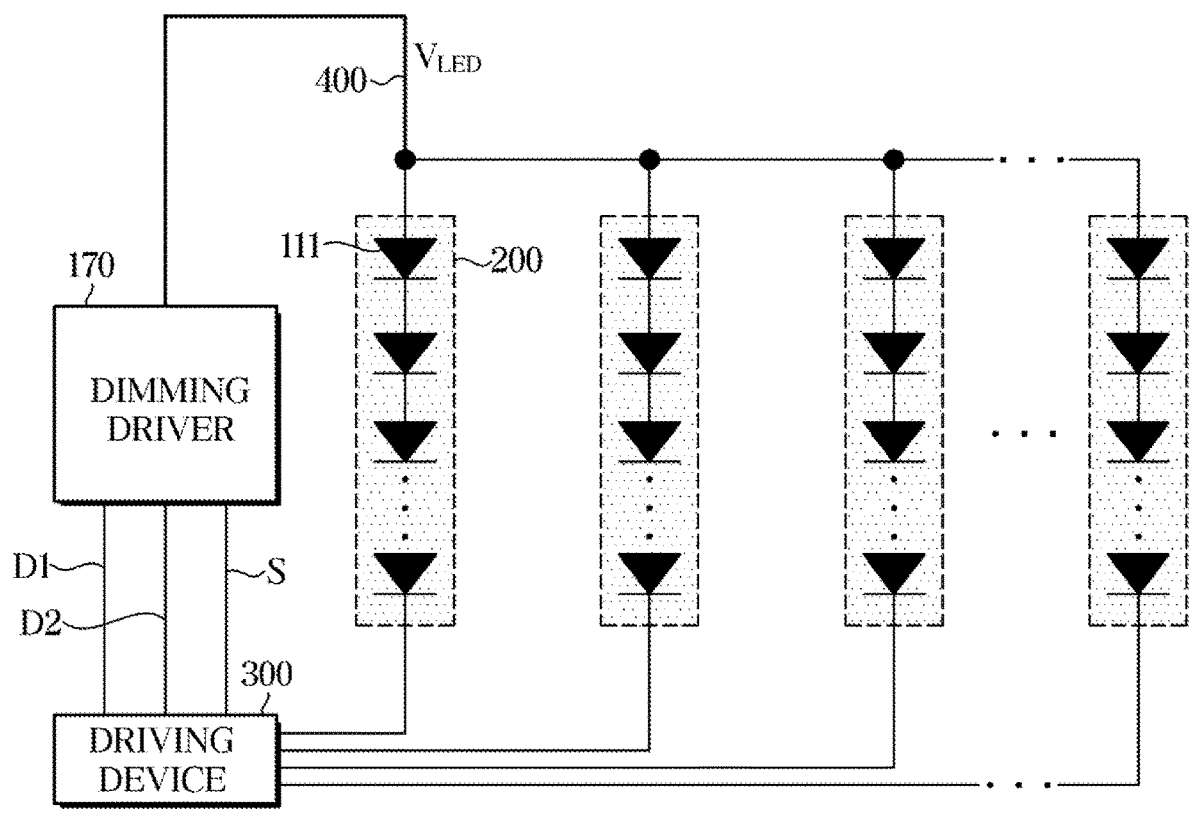
FIG. 7 illustrates a connection structure of a dimming driver, a driving device, and a dimming block, according to an embodiment.

FIG. 7 illustrates a connection structure of a dimming driver, a driving device, and a dimming block, according to an embodiment.

Referring to FIG. 7, each of a plurality of dimming blocks 200 may include a plurality of light sources 111 (e.g., LEDs) connected in series.

For example, when it is assumed that one dimming block 200 includes a first LED, a second LED, a third LED, and a fourth LED, an anode of the first LED may be connected to a power wire, a cathode of the first LED may be connected to an anode of the second LED, a cathode of the second LED may be connected to an anode of the third LED, a cathode of the third LED may be connected to an anode of the fourth LED, and a cathode of the fourth LED may be connected to a driving device 300.

That is, among the plurality of light sources 111 included in the dimming block 200 that may be connected in series, a first light source 111 may be connected to a power wire 400 to be supplied with power (e.g., driving voltage VLED), and a last light source 111 may be connected to the driving device 300.

Hereinafter, for convenience of description, among the plurality of dimming blocks 200, a light source 111 connected to the power wire 400 may be referred to as a "start light source" and a light source 111 connected to the driving device 300 may be referred to as a "last light source."

In an embodiment, the driving device 300 may receive an analog dimming signal from a dimming driver 170 and may store the received analog dimming signal while input is activated by the dimming driver 170. That is, a plurality of driving devices 300 may supply a driving current corresponding to the stored analog dimming signal to the plurality of light sources 111 (e.g., LEDs) while inputs are activated.

For example, the driving device 300 may control the driving current to be supplied to the plurality of dimming blocks 200 in a state in which the driving voltage VLED is applied to the plurality of dimming blocks 200. To this end, in an embodiment, the display apparatus 10 may include a plurality of scan lines S for supplying a scan signal to the plurality of driving devices 300, and a plurality of data lines (e.g., first data line D1 and second data line D2) for supplying an analog dimming signal to the plurality of driving devices 300.

In an optional or additional embodiment, the display apparatus 10 may further include a power wire 400 to provide a driving voltage to the plurality of driving devices 300.

In an embodiment, the plurality of scan lines S, the plurality of data lines D1 and D2, and/or the power wire 400 may be formed on a substrate 112.

Alternatively or additionally, the plurality of driving devices 300 may include circuits of various topologies to implement active matrix type driving. For example, each of the plurality of driving devices 300 may include a one-capacitor two-transistor (1C2T) circuit. However, a circuit structure of the driving device 300 may not be limited thereto. For example, the driving device 300 may include a three-transistor one-capacitor (3T1C) circuit to which transistors are added to correct a body effect of driving transistors.

In an embodiment, the driving device 300 may be provided as, for example, a single chip in which driving circuits are integrated. That is, the driving circuits may be integrated into one semiconductor chip.

The dimming driver 170 may transmit dimming data corresponding to an input image to the plurality of driving devices 300 through the plurality of data lines D1 and D2.

Alternatively or additionally, the dimming driver 170 may transmit a timing signal corresponding to a point in time, in which the plurality of dimming blocks 200 may emit light, to the plurality of driving devices 300 through the scan line S.

The plurality of driving devices 300 may control driving currents supplied to the plurality of dimming blocks 200 based at least on the dimming data and the timing signal.

FIG. 7 illustrates only some of the plurality of dimming blocks 200. However, in an embodiment, the display apparatus 10 may include additional dimming blocks 200, additional driving devices 300, additional data lines D1 and D2, additional scan lines S, and/or additional power wires 400 for connecting the dimming blocks 200 and the driving devices 300 that may be needed for performing local dimming.

Accordingly, it may be necessary and/or preferable to simplify the arrangement of the data lines D1 and D2, the scan lines S, and the power wires 400 on the substrate 112.

In an embodiment, the display apparatus 10 may include wires for the data lines D1 and D2, the scan lines S, the power wires 400, wires for connecting the plurality of driving devices 300 and the plurality of dimming blocks 200 (hereinafter referred to as control wires), and/or wires for connecting a plurality of light sources (hereinafter referred to as block wires). However, the types of wires that may be included by the display apparatus 10 may not be limited thereto. For example, the display apparatus 10 may include wires for connecting the plurality of driving devices 300 (hereinafter referred to as a timing wires).

Alternatively or additionally, at least a portion of the wires may be formed on the substrate 112 (e.g., a PCB).

Figure 8:
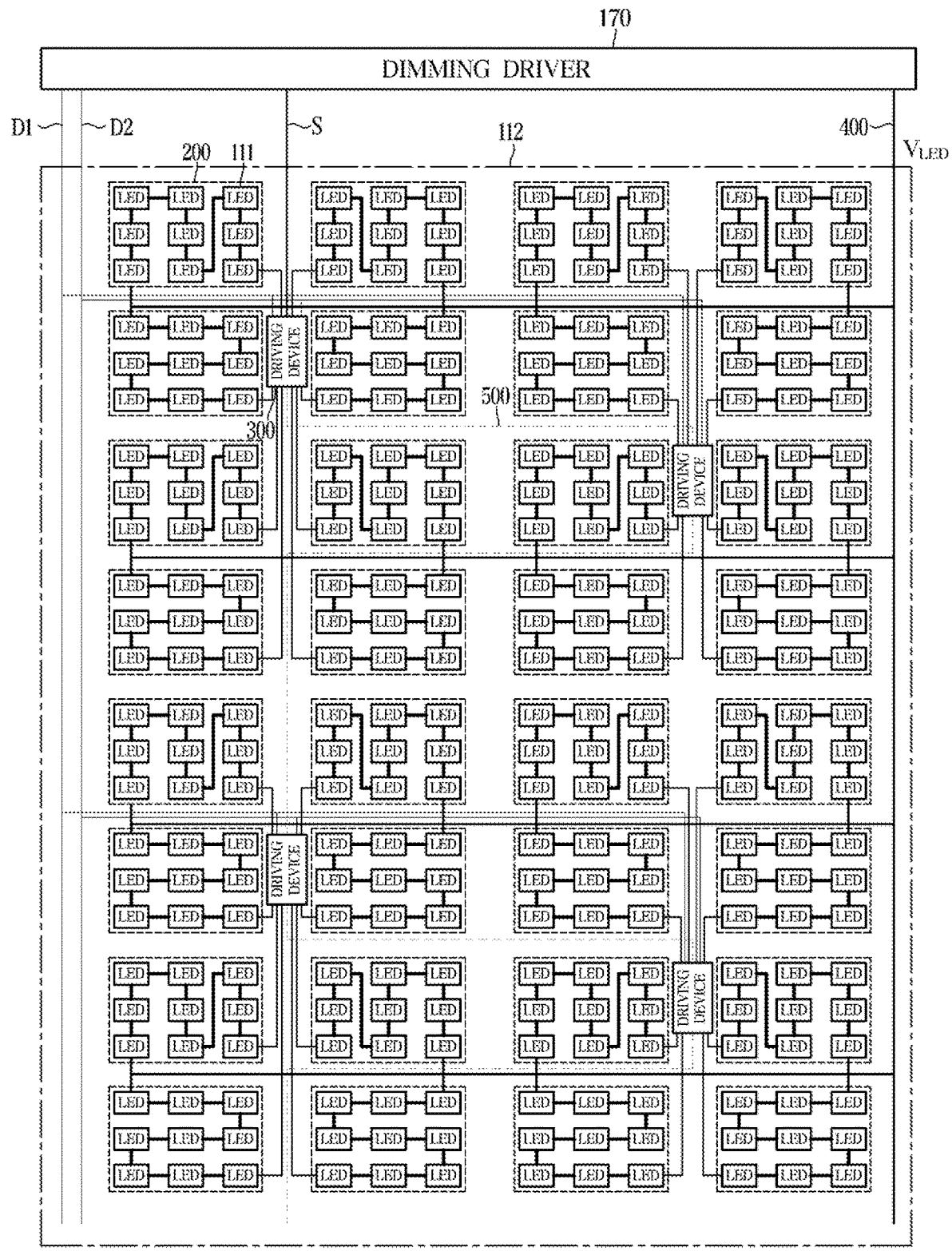
FIG. 8 illustrates an example of an arrangement of wires of a light apparatus, according to an embodiment.

FIG. 8 illustrates an example of an arrangement of wires of a light apparatus, according to an embodiment.

Referring to FIG. 8, a plurality of dimming blocks 200 may be arranged in a matrix on an upper surface of a substrate 112 of a light apparatus 100. Each dimming block of the plurality of dimming blocks 200 may include a plurality of light sources 111.

A plurality of light sources 111 belonging to one of the dimming blocks 200 may be arranged in a matrix on the upper surface of the substrate 112.

In a related light apparatus, power wires may be arranged to correspond to the number of rows of a plurality of dimming blocks. However, in an embodiment, the dimming blocks 200 in two adjacent rows from among the plurality of dimming blocks 200 may be electrically connected to a power wire 400 connected between the two rows. That is, the dimming blocks 200 in adjacent rows may share the power wire 400. Accordingly, the power wire 400 may be alternately arranged between two adjacent rows of an array of the dimming blocks 200.

For example, when a power wire 400 is arranged between a first row and a second row adjacent to the first row, the driving voltage VLED may be applied to dimming blocks 200 corresponding to the first row and dimming blocks 200 corresponding to the second row. Consequently, a power wire 400 may not need to be arranged between the second row and a third row adjacent to the second row.

Accordingly, for efficient arrangement of power wires, only one power wire 400 may be arranged between two rows instead of arranging power wires in each row in the related light apparatus. That is, according to an embodiment, the number of power wires may be reduced compared to the related light apparatus.

In a related light apparatus, the patterns of block wires for connecting a plurality of light sources may be the same regardless of the positions of dimming blocks. However, in an embodiment, the patterns of block wires for connecting a plurality of light sources may be different from each other according to the positions of the plurality of dimming blocks 200. That is, dimming blocks 200 arranged in adjacent columns may have different patterns of block wires. For example, patterns of block wires for dimming blocks 200 arranged in adjacent columns may be formed such that the last light sources connected to the driving device 300 may be adjacent to each other in a row direction. Accordingly, among the dimming blocks 200 arranged in the adjacent columns, a last light source of a left dimming block 200 may be positioned in a last column and a last light source of a right dimming block 200 may be positioned in a first column.

As another example, dimming blocks 200 arranged in adjacent rows may have different patterns of block wires. In such an example, patterns of block wires may be formed such that start light sources connected to a power wire may be adjacent to each other in a column direction. Accordingly, a start light source of an upper dimming block 200 may be positioned in a last row and a start light source of a lower dimming block 200 may be positioned in a first row.

In an embodiment, start light sources belonging to dimming blocks 200 arranged in the same row may be arranged in the same row. Alternatively or additionally, last light sources belonging to dimming blocks 200 arranged in the same column may be arranged in the same column.

According to an embodiment, a start light source and/or a last light source belonging to each of the plurality of dimming blocks 200 may share a wire path, thereby potentially improving the efficiency of wires on a substrate.

In a related light apparatus, a plurality of driving devices may be arranged between a plurality of dimming blocks. However, in an embodiment, the plurality of driving devices 300 may be alternately arranged between adjacent columns in a matrix formed by the plurality of dimming blocks 200. That is, the plurality of driving devices 300 may be alternately arranged between two adjacent columns of the array of the plurality of dimming blocks 200. For example, the plurality of driving devices 300 may be arranged between a first column and a second column adjacent to the first column, may not be arranged (e.g., may be absent) between the second column and a third column adjacent to the second column, and may be arranged between the third column and a fourth column adjacent to the third column. Consequently, the length of a control wire of the plurality of driving devices 300 may decrease.

Alternatively or additionally, the control wires of the plurality of driving devices 300 may be alternately arranged between columns of the plurality of dimming blocks 200, thereby securing the path of wires available between the plurality of dimming blocks 200.

In an embodiment, driving devices 300 arranged between a first column and a second column may be spaced apart in a row direction from driving devices 300 arranged between a third column and a fourth column. For example, the driving devices 300 arranged between the first column and the second column may be arranged to be adjacent to an even-numbered row (or an odd-numbered row), and the driving devices 300 arranged between the third column and the fourth column may be arranged to be adjacent to an odd-numbered row (or an even-numbered row).

According to an embodiment, a timing wire 500 may be formed to connect the driving devices 300 arranged between the first column and the second column and the driving devices 300 arranged in the third column and the fourth column.

In a related light apparatus, only driving devices arranged in the same column may be electrically connected to each other. However, in an embodiment, driving devices 300 arranged in different columns from among the plurality of driving devices 300 may be electrically connected to each other through the timing wire 500.

For example, the driving devices 300 arranged between the first column and the second column may be connected to the driving devices 300 arranged in the third column and the fourth column through the timing wire 500.

In an embodiment, the driving devices 300 may be each connected in series to the driving device 300 adjacent thereto through the timing wire 500 and thus share a timing signal, thereby potentially reducing the number of data lines and/or the number of scan lines, when compared to the related light apparatus.

FIG. 8 illustrates an arrangement of wires of the light apparatus 100 that may be a combination of the above-described embodiments. However, the light apparatus 100, according to an embodiment, may include an arrangement of wires according to one of the above-described embodiments, and/or a combination of at least a portion of the above-described embodiments.

The above-described embodiments are further described with reference to FIGS. 9 to 16.

Figure 9:
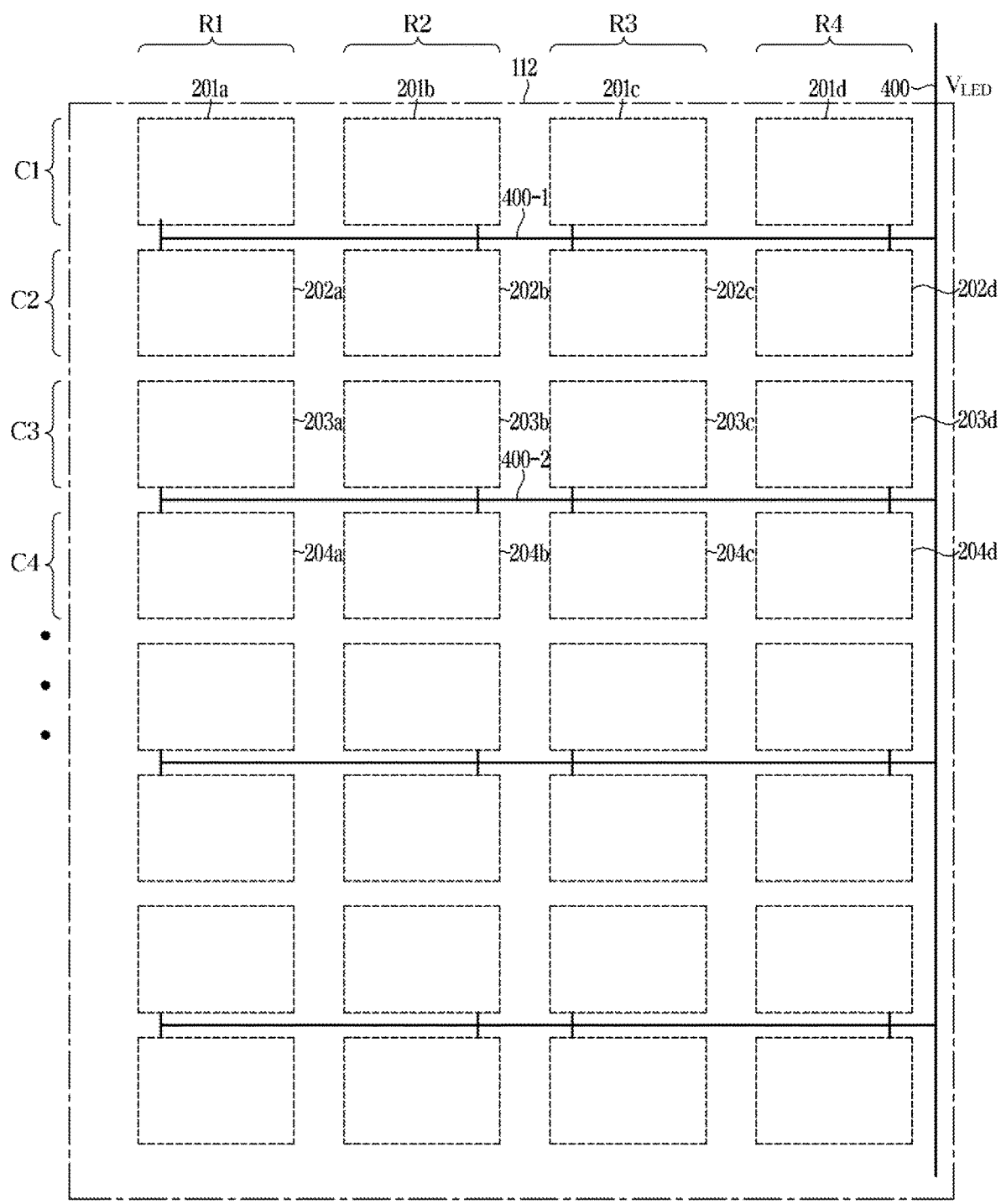
FIG. 9 illustrates an example of an arrangement of power wires of a light apparatus, according to an embodiment.

FIG. 9 illustrates an example of an arrangement of power wires of a light apparatus according to an embodiment.

Referring to FIG. 9, a substrate 112 may include a plurality of dimming blocks 200 arranged in a matrix. As described above, each of the plurality of dimming blocks 200 may include a plurality of light sources 111.

The plurality of dimming blocks 200 may be arranged in a plurality of rows (e.g., first row C1, second row C2, third row C3, fourth row C4, etc.), and a plurality of columns (e.g., first column R1, second column R2, third column R3, fourth column R4, etc.).

Hereinafter, for convenience of description, the rows C1, C2, C3, and C4 may be referred to as first, second, third, and fourth rows, respectively. Alternatively or additionally, the columns R1, R2, R3, and R4 may be referred to as first, second, third, and fourth columns, respectfully.

The first to fourth rows C1 to C4 may be understood to represent four consecutive rows adjacent to each other. As such, the first to fourth rows C1 to C4 may be also be referred to as a kth row, a $(k+1)^{th}$ row, a $(k+2)^{th}$ row, and a $(k+3)^{th}$ row, where k is a natural number.

The first to fourth columns R1 to R4 may be understood to represent four consecutive columns adjacent to each other. As such, the first to fourth columns R1 to R4 may also be referred to as an $m^{th}$ column, an $(m+1)^{th}$ column, an $(m+2)^{th}$ column, and an $(m+3)^{th}$ column, where m is a natural number.

Hereinafter, for convenience of description, dimming blocks 201a, 201b, 201c, and 201d arranged in the first row C1 may be referred to as first dimming blocks, dimming blocks 202a, 202b, 202c, and 202d arranged in the second row C2 may be referred to as second dimming blocks, dimming blocks 203a, 203b, 203c, and 203d arranged in the third row C3 may be referred to as third dimming blocks, and dimming blocks 204a, 204b, 204c, and 204d arranged in the fourth row C4 may be referred to as fourth dimming blocks. Alternatively or additionally, a light source included in the first dimming block, a light source included in the second dimming block, a light source included in the third dimming block, and a light source included in the fourth dimming block may be referred to as a first light source, a second light source, a third light source, and a fourth light source, respectively.

In an embodiment, dimming blocks 200 in two adjacent rows from among an array of the plurality of dimming blocks 200 may be electrically connected to a power wire 400 arranged between the two rows.

For example, as shown in FIG. 9, the first dimming blocks and the second dimming blocks may be electrically connected to a power wire 400-1 disposed between the first and second rows C1 and C2.

As another example, as shown in FIG. 9, the third dimming blocks and the fourth dimming blocks may be electrically connected to a power wire 400-2 disposed between the third and fourth rows C3 and C4.

Accordingly, a power wire 400 may not be provided between the second row C2 and the third row C3. That is, the power wire 400 may be absent between the second row C2 and the third row C3.

In an embodiment, the power wire 400-1 may be disposed between the first row C1 corresponding to the first dimming blocks and the second row C2 corresponding to the second dimming blocks. Alternatively or additionally, the power wire 400-1 may be connected to one of a plurality of first light sources and one of a plurality of second light sources.

In an optional or additional embodiment, the power wire 400 may not be disposed (e.g., may be absent) between the second row C2 corresponding to the second dimming blocks and the third row C3 corresponding to the third dimming blocks.

In an embodiment, the power wire 400-2 may be disposed between the third row C3 corresponding to the third dimming blocks and the fourth row C4 corresponding to the fourth dimming blocks. Alternatively or additionally, the power wire 400-2 may be connected to one of a plurality of third light sources and one of a plurality of fourth light sources.

In an embodiment, the power wires 400-1 and 400-2 may be disposed between two adjacent rows of the array of the plurality of dimming blocks 200. Alternatively or additionally, each of the power wires 400-1 and 400-2 may include a portion extending in a row direction and a portion extending in a column direction. Dimming blocks 200 corresponding to two adjacent rows (e.g., first dimming blocks and second dimming blocks) may be connected to the power wire 400 through the portions of at least one of the power wires 400-1 and 400-2 that extend in the column direction.

In an optional or additional embodiment, the portions of the power wires 400-1 and 400-2 that extend in the column direction may alternately extend toward a left and/or a right portion of the dimming blocks 200 corresponding to the columns R1, R2, R3, and R4, respectively.

For example, as shown in FIG. 9, the power wire 400-1 may extend from a lower left end of the first dimming blocks 201a and 201c to an upper left end of the second dimming blocks 202a and 202c, respectively. Alternatively or additionally, the power wire 400-1 may extend from a lower right end of the first dimming blocks 201b and 201d to an upper right end of the second dimming blocks 202b and 202d, respectively.

For another example, as shown in FIG. 9, the power wire 400-2 may extend from a lower left end of the third dimming blocks 203a and 203c to an upper left end of the fourth dimming blocks 204a and 204c, respectively. Alternatively or additionally, the power wire 400-2 may extend from a lower right end of the third dimming blocks 203b and 203d to an upper right end of the fourth dimming blocks 204b and 204d, respectively.

According to an embodiment, an empty space between two adjacent rows (e.g., a space between the second and third rows C2 and C3) of the array of the plurality of dimming blocks 200 may be used by alternately arranging the power wire 400 between every two adjacent rows of the array of the plurality of dimming blocks 200.

According to an embodiment, the number of power wires 400 may be reduced by sharing the power wires 400, which extend in the row direction, by dimming blocks 200 located in adjacent rows.

According to an embodiment, as the power wires 400 alternately extend toward the left or right portion of the dimming blocks 200, an empty space between columns (e.g., a space between the columns R1 and the R2 and/or a space between the columns R3 and the R4) may be used.

Embodiments related to the arrangement of the power wires 400, described with reference to FIG. 9, may be directly applicable to a display apparatus and/or a combination thereof with the above-described embodiments and/or embodiments described below with reference to FIGS. 10 to 16.

Figure 10:
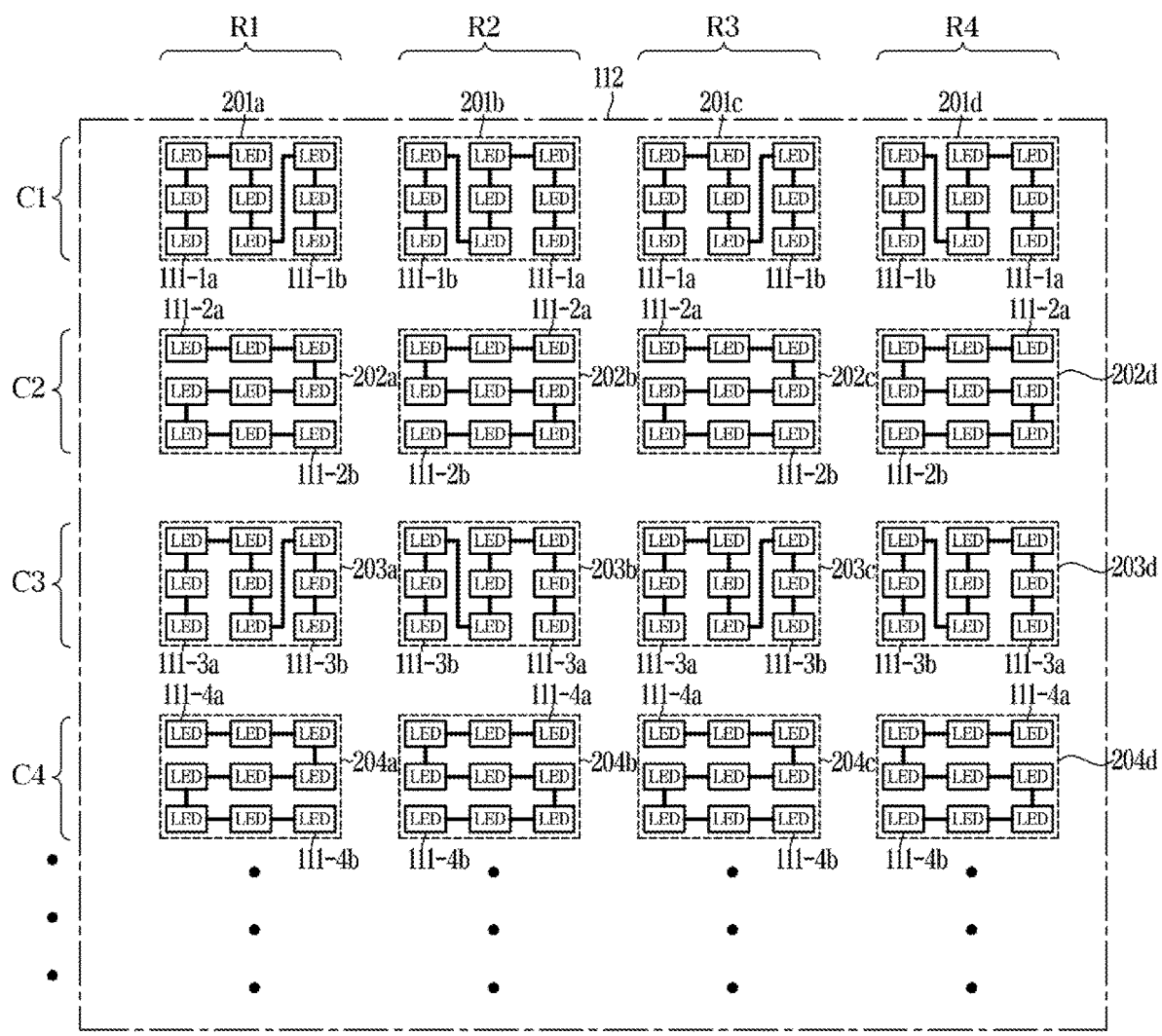
FIG. 10 illustrates an example of an arrangement of wires for connecting a plurality of light sources, according to an embodiment.
Figure 11:
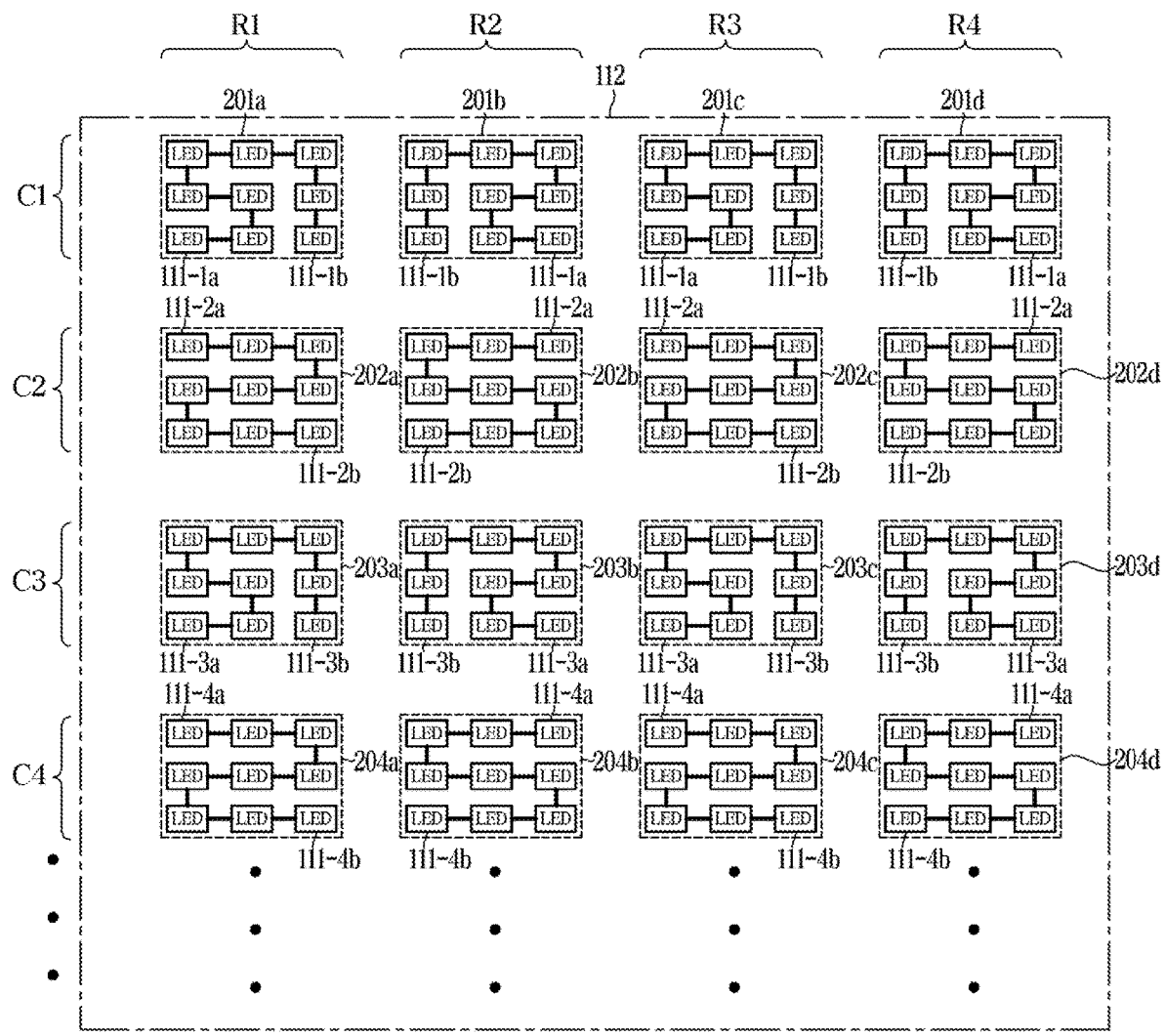
FIG. 11 illustrates an example of an arrangement of wires for connecting a plurality of light sources, according to an embodiment.

FIGS. 10 and 11 illustrate examples of an arrangement of wires for connecting a plurality of light sources, according to embodiments.

Referring to FIGS. 10 and 11, each of a plurality of dimming blocks 200 may include a plurality of light sources 111 arranged in a matrix. Each of a plurality of first dimming blocks (e.g., 201a, 201b, 201c, and 201d) may include a plurality of first light sources (e.g., 111-1a to 111-1b) arranged in a matrix. The plurality of first light sources included in each of the plurality of first dimming blocks may include a start light source 111-1a and a last light source 111-1b.

Each of a plurality of second dimming blocks (e.g., 202a, 202b, 202c, and 202d) may include a plurality of second light sources (e.g., 111-2a to 111-2b) arranged in a matrix. The plurality of second light sources included in each of the plurality of second dimming blocks may include a start light source 111-2a and a last light source 111-2b.

Each of a plurality of third dimming blocks (e.g., 203a, 203b, 203c, and 203d) may include a plurality of third light sources (e.g., 111-3a to 111-3b) arranged in a matrix. The plurality of third light sources included in each of the plurality of third dimming blocks may include a start light source 111-3a and a last light source 111-3b.

Each of a plurality of fourth dimming blocks (e.g., 204a, 204b, 204c, and 204d) may include a plurality of fourth light sources (e.g., 111-4a to 111-4b) arranged in a matrix. The plurality of fourth light sources included in each of the plurality of fourth dimming blocks may include a start light source 111-4a and a last light source 111-4b.

In an embodiment, a block wire connecting the plurality of light sources 111 may be connected from the start light source to the last light source.

In an optional or additional embodiment, the positions of a start light source and a last light source of dimming blocks 200 arranged in two adjacent rows (e.g., C1 and C2, or C3 and C4) may be different from each other. Accordingly, the patterns of block wires connecting light sources 111 included in the dimming blocks 200 arranged in the two adjacent rows may be different from each other.

For example, the first dimming blocks arranged in the first row C1 may include start light sources 111-1a disposed in a lowermost row. Alternatively or additionally, the second dimming blocks arranged in the second row C2 may include start light sources 111-2a disposed in an uppermost row.

For another example, the third dimming blocks arranged in the third row C3 may include start light sources 111-3a disposed in the lowermost row. Alternatively or additionally, the fourth dimming blocks arranged in the fourth row C4 may include start light sources 111-4a disposed in the uppermost row.

In an embodiment, dimming blocks 200 arranged in the same column (e.g., R1, R2, R3, or R4) may include a start light source disposed in the same row.

For example, the dimming blocks 201a, 202a, 203a, and 204a arranged in the first column R1, and/or the dimming blocks 201c, 202c, 203c, and 204c arranged in the third column R3, may include start light sources (e.g., 111-1a, 111-2a, 111-3a, and 111-4a, respectively) arranged in a leftmost column.

For another example, the dimming blocks 201b, 202b, 203b, and 204b arranged in the second column R2, and/or the dimming blocks 201d, 202d, 203d, and 204d arranged in the fourth column R4, may include start light sources (e.g., 111-1a, 111-2a, 111-3a, and 111-4a, respectively) arranged in a rightmost column.

In an embodiment, the dimming blocks 200 arranged in the same column (e.g., R1, R2, R3, or R4) may include a last light source disposed in the same column.

In an optional or additional embodiment, each of the dimming blocks 200 arranged in adjacent columns (e.g., R1 and R2, or R3 and R4) may include a last light source disposed in the adjacent columns.

For example, the dimming blocks 201a, 202a, 203a, and 204a arranged in the first column R1, and/or the dimming blocks 201c, 202c, 203c, and 204c arranged in the third column R3, may include the last light sources (e.g., 111-1b, 111-2b, 111-3b, and 111-4b, respectively) arranged in the rightmost column.

For another example, the dimming blocks 201b, 202b, 203b, and 204b arranged in the second column R2, and/or the dimming blocks 201d, 202d, 203d, and 204d arranged in the fourth column R4 may include the last light sources (e.g., 111-1b, 111-2b, 111-3b, and 111-4b, respectively) disposed in the leftmost column.

Accordingly, the last light sources 111-1b, 111-2b, 111-3b, and 111-4b included, respectively, in the dimming blocks 201a, 202a, 203a, and 204a disposed in the first column R1, and the last light sources 111-1b, 111-3b, and 111-4b included, respectively, in the dimming blocks 201b, 202b, 203b, and 204b disposed in the second column R2, may be located near each other.

Furthermore, the last light sources 111-1b, 111-2b, 111-3b, and 111-4b included, respectively, in the dimming blocks 201c, 202c, 203c, and 204c in the third column R3, and the last light sources 111-1b, 111-3b, and 111-4b included, respectively, in the dimming blocks 201d, 202d, 203d, and 204d in the fourth column R4, may be located near each other.

In an embodiment, each of the plurality of dimming blocks 200 may include a last light source therein in the same row.

For example, the plurality of dimming blocks 200 may include the last light sources 111-1b, 111-2b, 111-3b, and 111-4b disposed in the lowermost row.

In an embodiment, each of the first and third dimming blocks may include the start light source (e.g., 111-1a, 111-3a) and the last light source (e.g., 111-1b, 111-3b) disposed in the same row. In an optional or additional embodiment, each of the second and fourth dimming blocks may include the start light source (e.g., 111-2a, 111-4a) and the last light source (e.g., 111-2b, 111-4b). Consequently, the start light source (e.g., 111-2a, 111-4a) and the last light source (e.g., 111-2b 111-4b) included in each of the second and fourth dimming blocks may be disposed farthest from each other in these dimming blocks. For example, the start light source 111-2a may be disposed at a left uppermost-end of the second dimming block 202a, and the last light source 111-2b may be disposed at a right lowermost-end thereof. For another example, the start light source 111-2a may be disposed at a right uppermost-end of the second dimming block 202b, and the last light source 111-2b may be disposed at a left lowermost-end thereof.

In an embodiment, the light sources included in each of the plurality of dimming blocks 200 may be connected to each other by a block wire. The block wire may be designed to satisfy the arrangement of the start light sources and the last light sources as described above. In an optional or additional embodiment, the block wires may be formed on a substrate 112 to connect all light sources in the dimming blocks 200 in series. Alternatively or additionally, the block wires may connect light sources between the start light source and the last light source.

Referring to FIG. 10, a block wire connecting the light sources included in each of the first and third dimming blocks may be formed in a zigzag fashion in a vertical direction. Thus, portions of the block wire that connect the light sources included in each of the first and third dimming blocks in the column direction may be longer than portions thereof in the row direction. For example, the block wire connecting the light sources included in the first and third dimming blocks may be connected in the column direction toward the start light source (e.g., 111-1a and 111-3a, respectively) and the last light source (e.g., 111-1b and 111-3b, respectively).

In an optional or additional embodiment, a block wire connecting the light sources included in each of the second and fourth dimming blocks may be formed in a zigzag fashion in left and right directions. For example, the block wire connecting the light sources included in each of the second and fourth dimming blocks may be connected in the row direction toward the start light source (e.g., 111-2a 111-4a, respectively) and the last light source (e.g., 111-2b and 111-4b, respectively). Thus, portions of the block wire that connect the light sources included in each of the second and fourth dimming blocks in the row direction may be longer than portions thereof in the column direction.

According to various embodiments, an arrangement of block wires for connecting the light sources in a dimming block in series and connecting light sources between a start light source and a last light source may be employed as an example of an arrangement of block wires.

Referring to FIG. 11, a block wire connecting light sources included in each of the first and third dimming blocks may connect adjacent light sources. The lengths of portions of the block wire that connect the light sources included in each of the first and third dimming blocks in the column direction may be the same as those of portions thereof in the row direction. Consequently, the number of block wires may be minimized.

For example, the block wire connecting the light sources included in the first and third dimming blocks may be connected in the row direction toward the start light source (e.g., 111-1a and 111-3a, respectively) and connected in the column direction toward the last light source (e.g., 111-1b 111-3b, respectively).

A block wire connecting the light sources included in each of the second and fourth dimming blocks may be formed in a zigzag fashion in left and right directions. For example, the block wire connecting the light sources included in each of the second and fourth dimming blocks may be connected in the row direction toward the start light source (e.g., 111-2a and 111-4a, respectively) and the last light source (e.g., 111-2b and 111-4b, respectively). Thus, portions of the block wire that connect the light sources included in each of the second and fourth dimming blocks in the row direction may be longer than portions thereof in the column direction.

According to various embodiments, the block wire connecting the light sources included in each of the second and fourth dimming blocks may be connected in the column direction toward the start light source (e.g., 111-2a and 111-4a, respectively) and the last light source (e.g., 111-2b and 111-4b, respectively). That is, the block wire connecting the light sources included in each of the second and fourth dimming blocks may be formed in a zigzag shape in a vertical direction.

A block wire structure for connecting the light sources 111 included in each of the plurality of dimming blocks 200 is not limited thereto. For example, a structure for connecting light sources between a start light source and a last light source, which may be arranged at positions satisfying the above-described configurations, in series may be employed as a block wire structure.

According to an embodiment, start light sources of dimming blocks arranged in adjacent rows may be arranged adjacent to each other, so that the start light sources of the dimming blocks in the adjacent rows may be easily connected to a different wire (e.g., a power wire).

According to an embodiment, last light sources of dimming blocks arranged in adjacent columns may be arranged adjacent to each other, so that the last light sources of the dimming blocks in the adjacent columns may be easily connected to a different wire (e.g., a control wire).

Embodiments related to the arrangement of light sources and the arrangement of power wires, described with reference to FIGS. 10 and 11, may be directly applicable to the display apparatus 10 and/or a combination thereof with the above-described embodiments and/or embodiments described below with reference to FIGS. 12 to 16.

Figure 12:
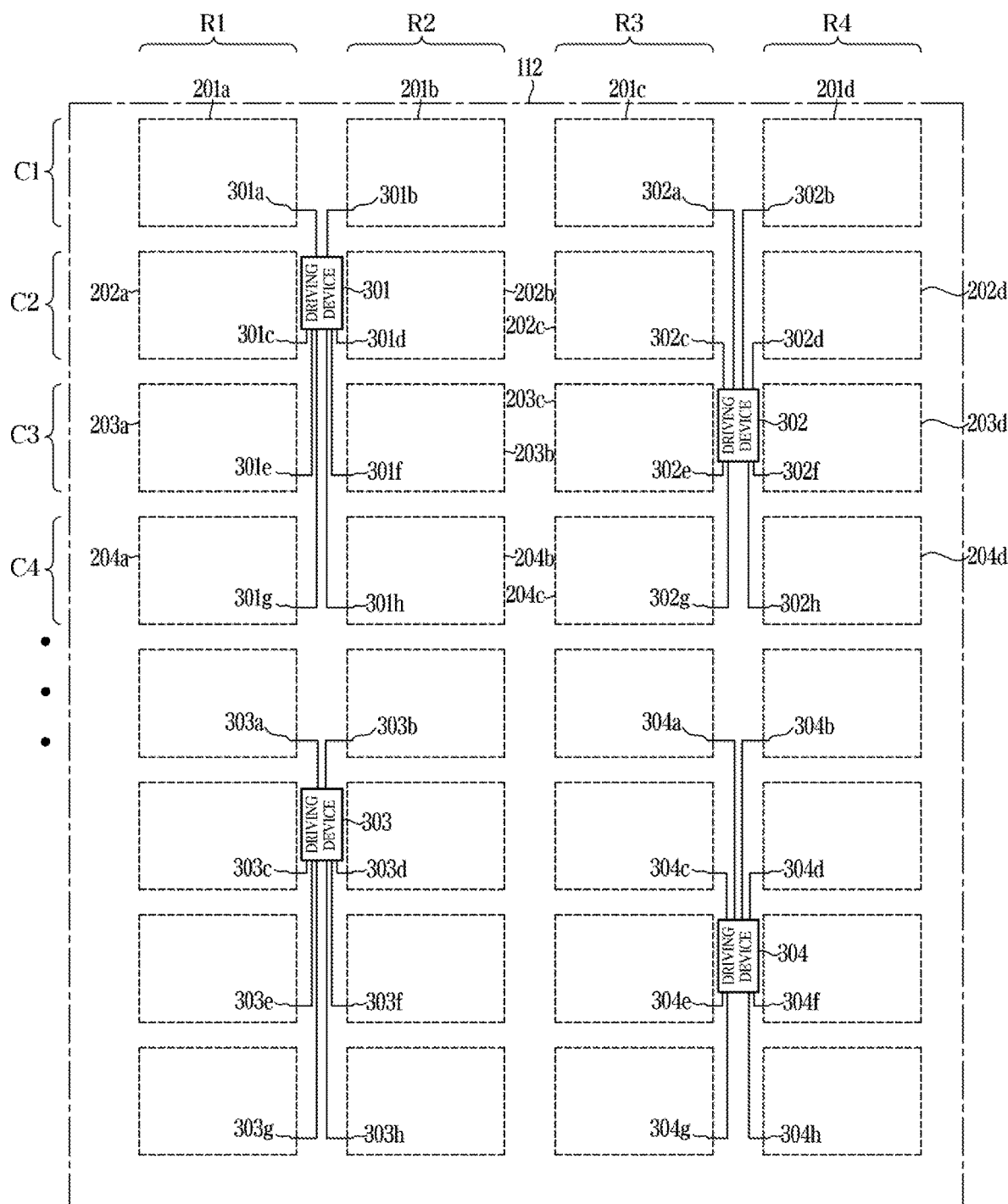
FIG. 12 illustrates an example of an arrangement of a plurality of driving devices, according to an embodiment.

FIG. 12 illustrates an example of an arrangement of a plurality of driving devices, according to an embodiment.

Referring to FIG. 12, a light apparatus 100 may include a plurality of driving devices 300 (e.g., first driving device 301, second driving device 302, third driving device 303, and fourth driving device 304).

The plurality of driving devices 300 may be arranged on an upper surface of a substrate of the light apparatus 100. Alternatively or additionally, the plurality of driving devices 300 may supply a driving current to a plurality of dimming blocks 200.

In an embodiment, each of the plurality of driving devices 300 may be disposed between two adjacent columns of an array of the plurality of dimming blocks 200. Alternatively or additionally, each of the plurality of driving devices 300 may be electrically connected to at least one dimming block 200 from among the plurality of dimming blocks 200 in adjacent columns to supply a driving current.

For example, the first driving device 301 and the third driving device 303 may be disposed between a first column R1 and a second column R2.

For another example, the second driving device 302 and the fourth driving device 304 may be disposed between a third column R3 and a fourth column R4.

Each of the plurality of driving devices 300 may be electrically connected to N dimming blocks 200 in a left column and N dimming blocks 200 in a right column among dimming blocks 200 in two adjacent columns through a control wire. The number (e.g., 2×N) of dimming blocks 200 to which each of the plurality of driving devices 300 is connected may be variously changed, according to an embodiment. For example, the number of control wires may be 2×N.

Accordingly, the plurality of driving devices 300 may not be disposed (e.g., may be absent) between the second column R2 and the third column R3. That is, in an embodiment, the plurality of driving devices 300 may be alternately disposed between columns.

The first driving device 301 between the first column R1 and the second column R2 may be electrically connected to the dimming blocks 200 in the first column R1 and the second column R2 from among the plurality of dimming blocks 200. That is, the first driving device 301 may be electrically connected to dimming blocks 200 in the first column R1, the second column R2, and the first to fourth rows C1 to C4 through control wires (e.g., 301a, 301b, 301c, 301d, 301e, 301f, 301g, and 301h).

In an embodiment, the control wires 301a, 301b, 301c, 301d, 301e, 301f, 301g, and 301h may be electrically connected to last light sources of dimming blocks 201a, 201b, 202a, 202b, 203a, 203b, 204a, and 204b, respectively.

According to embodiments described with reference to FIGS. 10 and 11, each of the dimming blocks 201a, 202a, 203a, and 204a in the first column R1 may include a last light source in a rightmost column. Alternatively or additionally, each of the dimming blocks 201b, 202b, 203b, and 204b in the second column R2 may include a last light source in a leftmost column.

In an embodiment, the second driving device 302 between the third column R3 and the fourth column R4 may be electrically connected to the dimming blocks 200 in the third column R3 and the fourth column R4 from among the plurality of dimming blocks 200.

That is, the second driving device 302 may be electrically connected to the dimming blocks 200 in the third column R3, the fourth column R4, and the first rows C1 to the fourth row C4 through control wires (e.g., 302a, 302b, 302c, 302d, 302e, 302f, 302g, and 302h).

In an embodiment, the control wires 302a, 302b, 302c, 302d, 302e, 302f, 302g, and 302h may be electrically connected to last light sources of the dimming blocks 201c, 201d, 202c, 202d, 203c, 203d, 204c, and 204d, respectively.

According to embodiments described with reference to FIGS. 10 and 11, the dimming blocks 201c, 202c, 203c, and 204c in the third column R3 may include last light sources in the rightmost column. Alternatively or additionally, the dimming blocks 201d, 202d, 203d, and 204d in the fourth column R4 may include last light sources in the leftmost column.

The third driving device 303 may be electrically connected to dimming blocks 200 in four rows adjacent to the first column R1, the second column R2, and the fourth row C4 through control wires (e.g., 303a, 303b, 303c, 303d, 303e, 303f, 303g, and 303h).

The fourth driving device 304 may be electrically connected to dimming blocks 200 in four rows adjacent to the third column R3, the fourth column R4, and the fourth row C4 through control wires (e.g., 304a, 304b, 304c, 304d, 304e, 304f, 304g, and 304h).

According to an embodiment, the plurality of driving devices 300 may be alternately disposed between columns, thereby minimizing the number of control wires.

According to an embodiment, the driving device 300 and the dimming blocks 200 may be easily connected to each other using a minimum number of control wires.

Alternatively or additionally, according to an embodiment, the plurality of driving devices 300 may be connected to dimming blocks 200 in two adjacent columns, thereby minimizing the number of driving devices.

Figure 13:
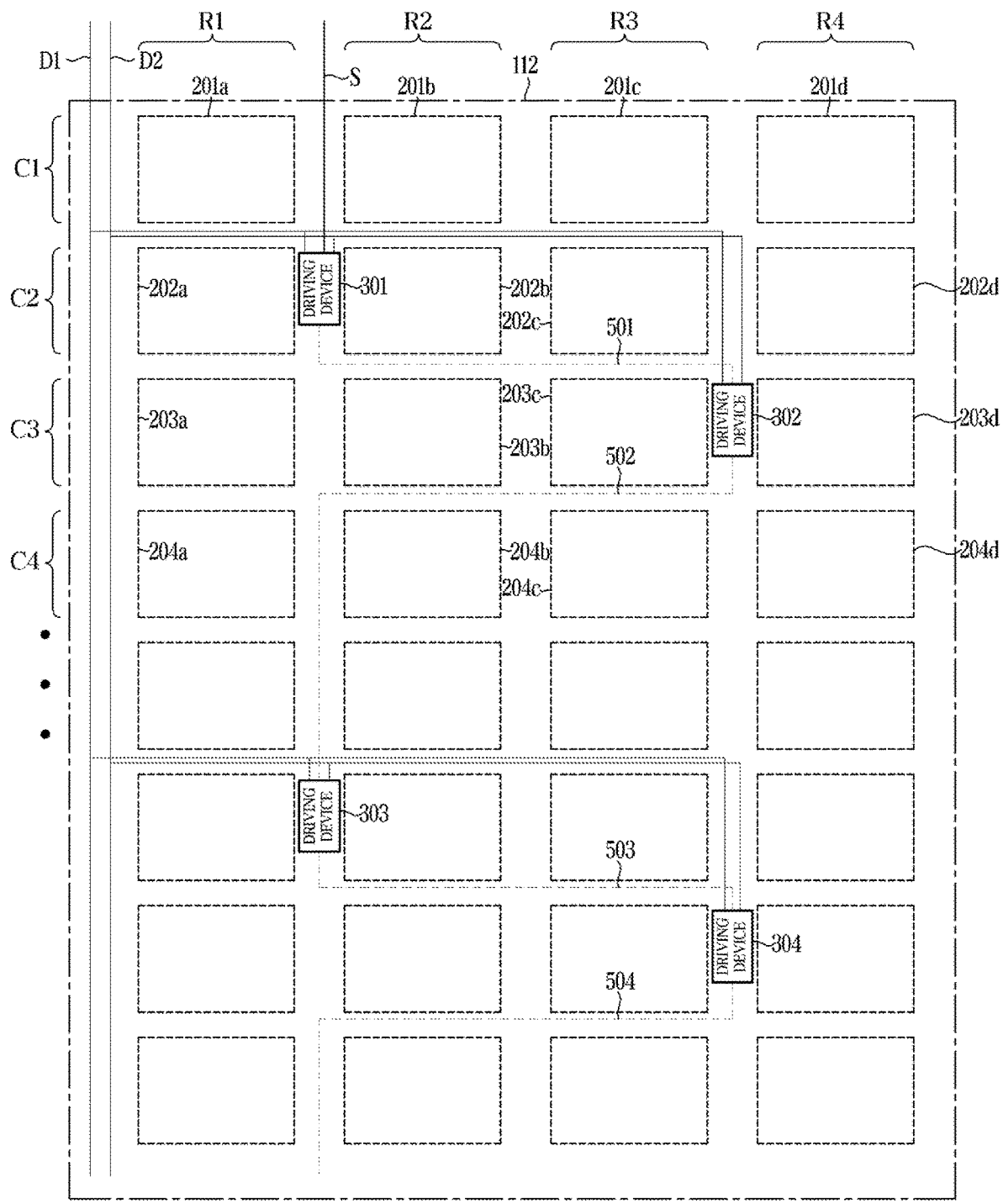
FIG. 13 illustrates an example of a connection structure between a plurality of driving devices, according to an embodiment.

FIG. 13 illustrates an example of a connection structure between a plurality of driving devices, according to an embodiment.

Referring to FIG. 13, in an embodiment, a first driving device 301 may be located above a second driving device 302, the second driving device 302 may be located above a third driving device 303, and the third driving device 303 may be located above a fourth driving device 304.

Accordingly, the first driving device 301, the second driving device 302, the third driving device 303, and the fourth driving device 304 may be disposed on the substrate 112 in a zigzag fashion.

In this case, each of the plurality of driving devices 300 in two adjacent columns among an array of the plurality of driving devices 300 may transmit a timing signal to other driving devices 300 through a timing wire 500 (see FIG. 8).

In an embodiment, the plurality of driving devices 300 may be connected to a driving device in a different column through a timing wire and thus transmit the timing signal to the driving devices in the different column.

For example, the first driving device 301 may transmit the timing signal to the second driving device 302 through a timing wire 501. The second driving device 302 may transmit the timing signal to the third driving device 303 through a timing wire 502. The third driving device 303 may transmit the timing signal to the third driving device 303 through a timing wire 503. The fourth driving device 304 may transmit the timing signal to another driving device, which may be disposed between the first column R1 and the second column R2 and below the fourth driving device 304, through a timing wire 504.

The timing signal may be a signal for activating the plurality of driving devices 300 (e.g., a signal corresponding to a scan signal). Upon receiving the timing signal, the driving device 300 may control a driving current supplied to the dimming blocks 200 based at least on the dimming data received through data lines D1 and D2.

In an embodiment, dimming data for at least one column of the array of the plurality of dimming blocks 200 may be transmitted to the driving device 300 through each of at least one data line (e.g., the data lines D1 and D2).

A scan signal may be supplied to the plurality of driving devices 300 through at least one scan line S.

In an embodiment in which the plurality of driving devices 300 may be connected by the timing wire 500, when the scan signal is supplied to only one driving device (e.g., the first driving device 301) through the scan line S, the timing signal corresponding to the scan signal may be transmitted to another driving device (e.g., the second driving device 302).

Each of the plurality of driving devices 300 may control a driving current supplied to each of the plurality of dimming blocks 200 based at least on the dimming data received through the data lines D1 and D2, when switched to a state in which the plurality of driving devices 300 are capable of receiving the dimming data according to the scan signal and/or the timing signal.

In a related light apparatus, a timing signal may be transmitted between only driving devices in the same column and thus each data line may provide for transmitting dimming data corresponding to one column. However, in an embodiment, each of the data lines D1 and D2 may be used for transmitting dimming data corresponding to at least two columns. In an optional or additional embodiment, dimming data corresponding to odd-numbered columns (or even numbered columns) may be transmitted through the first data line D1. Alternatively or additionally, dimming data corresponding to even-numbered columns (or odd-numbered columns) may be transmitted through the second data line D2.

For example, the first and third driving devices 301 and 303 between the first column R1 and the second column R2 may be activated by the scan signal and/or the timing signal during the transmission of dimming data corresponding to the first column R1 through the first data line D1. The second and fourth driving devices 302 and 304 between the third column R3 and the fourth column R4 may be activated by the timing signal during the transmission of dimming data corresponding to the third column R3 through the first data line D1.

For another example, the driving first and third devices 301 and 303 between the first column R1 and the second column R2 may be activated by the scan signal or the timing signal during the transmission of dimming data corresponding to the second column R2 through the second data line D2. The second and fourth driving devices 302 and 304 between the third column R3 and the fourth column R4 may be activated by the timing signal during the transmission of dimming data corresponding to the fourth column R4 through the first data line D1.

That is, dimming data to be transmitted through one data line may be shared by a plurality of columns of the array of the plurality of dimming blocks 200 and a point in time when a driving current is to be supplied may be determined based at least on the timing signal, thereby potentially preventing inefficiency caused when data lines may be additionally provided for the plurality of columns.

In an embodiment, each of the plurality of driving devices 300 may be connected in series to one of driving devices 300 in a different column. Consequently, the plurality of driving devices 300 may share the timing signal, thereby reducing the number of data lines, when compared with a related light apparatus.

Embodiments related to the arrangement of driving devices, described with reference to FIGS. 12 and 13, may be directly applicable to the display apparatus 10 and/or a combination thereof with the above-described embodiments and/or embodiments described below with reference to FIGS. 14 to 16.

The embodiments shown in FIGS. 9 to 13 may be combined with each other and/or may be directly applied to the display apparatus 10.

By combining the embodiments of FIG. 9 and the embodiments of FIGS. 10 and 11, the power wire 400 between adjacent rows may be easily connected to start light sources of dimming blocks 200 disposed in adjacent rows.

The first light source 111-1a connected to the power wire 400 from among the first light sources included in each of the first dimming blocks may be adjacent to the second light source 111-2a connected to the power wire 400 from among the plurality of second dimming blocks included in each of the second dimming blocks in the column direction.

The first light source 111-1a connected to the power wire 400 from among the first light sources included in each of the first dimming blocks may be provided in a lowermost row of each of the first dimming blocks, and the second light source 111-2a connected to the power wire 400 from among the second dimming blocks included in each of the second dimming blocks may be provided in an uppermost row of each of the second dimming blocks.

By combining the embodiments of FIGS. 10 and 11 and the embodiments of FIG. 12, driving devices 300 between adjacent columns may be easily connected to last light sources of dimming blocks 200 in adjacent columns.

Last light sources 111-1b, 111-2b, 111-3b, and 111-4b connected to the driving device 300 from among the plurality of light sources included in the dimming blocks 201a, 202a, 203a, 204a in the first column R1, and/or the dimming blocks 201c, 202c, 203c, and 204c in the third column R3 may be located in a rightmost column. Alternatively or additionally, last light sources 111-1b, 111-2b, 111-3b, and 111-4 connected to the driving device 300 from among the plurality of light sources included in the dimming blocks 201b, 202b, 203b, 204b in the second column R2, and/or the dimming blocks 201d, 202d, 203d, and 204d in the fourth column R4 may be located in a leftmost column.

That is, each of the plurality of dimming blocks in each column may include a last light source in a column near a driving device.

By combining the embodiments of FIG. 9, the embodiments of FIGS. 10 and 11, and the embodiments of FIG. 12, the power wire 400 between adjacent rows may be easily connected to a start light source of each of the plurality of dimming blocks 200 in adjacent rows. Alternatively or additionally, the plurality of driving device 300 between adjacent columns may be easily connected to last light sources of each of the plurality of dimming blocks 200 in adjacent columns.

Among the plurality of first light sources included in the plurality of first dimming blocks, the start light source 111-1*a* connected to the power wire 400 may be arranged in the lowermost rows of the first dimming blocks. Alternatively or additionally, the last light source 111-1*b* connected to the driving device 300 may be arranged in the lowermost rows of the first dimming blocks.

In an optional or additional embodiment, among the plurality of second light sources included in the second dimming blocks, the start light source 111-2*a* connected to the power wire 400 may be arranged in the uppermost rows of the second dimming blocks, and the last light source 111-2*b* connected to the driving device 300 may be also arranged in the lowermost rows of the second dimming blocks. Accordingly, the plurality of second dimming blocks may include the start light source 111-2*a* and the last light source 111-2*b* disposed farthest from each other.

The positions of a start light source and a last light source may not be limited to the above-described embodiments, provided that the start light source is arranged in a row of a dimming block near a space in which a power wire may be arranged and that the last light source is arranged in a column near a space in which a driving device may be arranged.

For example, in contrast to FIGS. 10 and 11, the last light source 111-3*b* connected to the driving device 300 among the plurality of third light sources included in each of the plurality of third dimming blocks 203*a* and 203*b* may be arranged in the uppermost rows of the third dimming blocks. Accordingly, the lengths of the control wires 301*e* and 301*f* may decrease and/or may be minimized.

For another example, in contrast to FIGS. 10 and 11, the last light source 111-4*b* connected to the driving device 300 among the plurality of fourth light sources included in each of the plurality of fourth dimming blocks may be arranged in the uppermost rows of the fourth dimming blocks. Accordingly, the lengths of the control wires 301*g*, 301*h*, 302*g*, and 302*h* may decrease.

Figure 14:
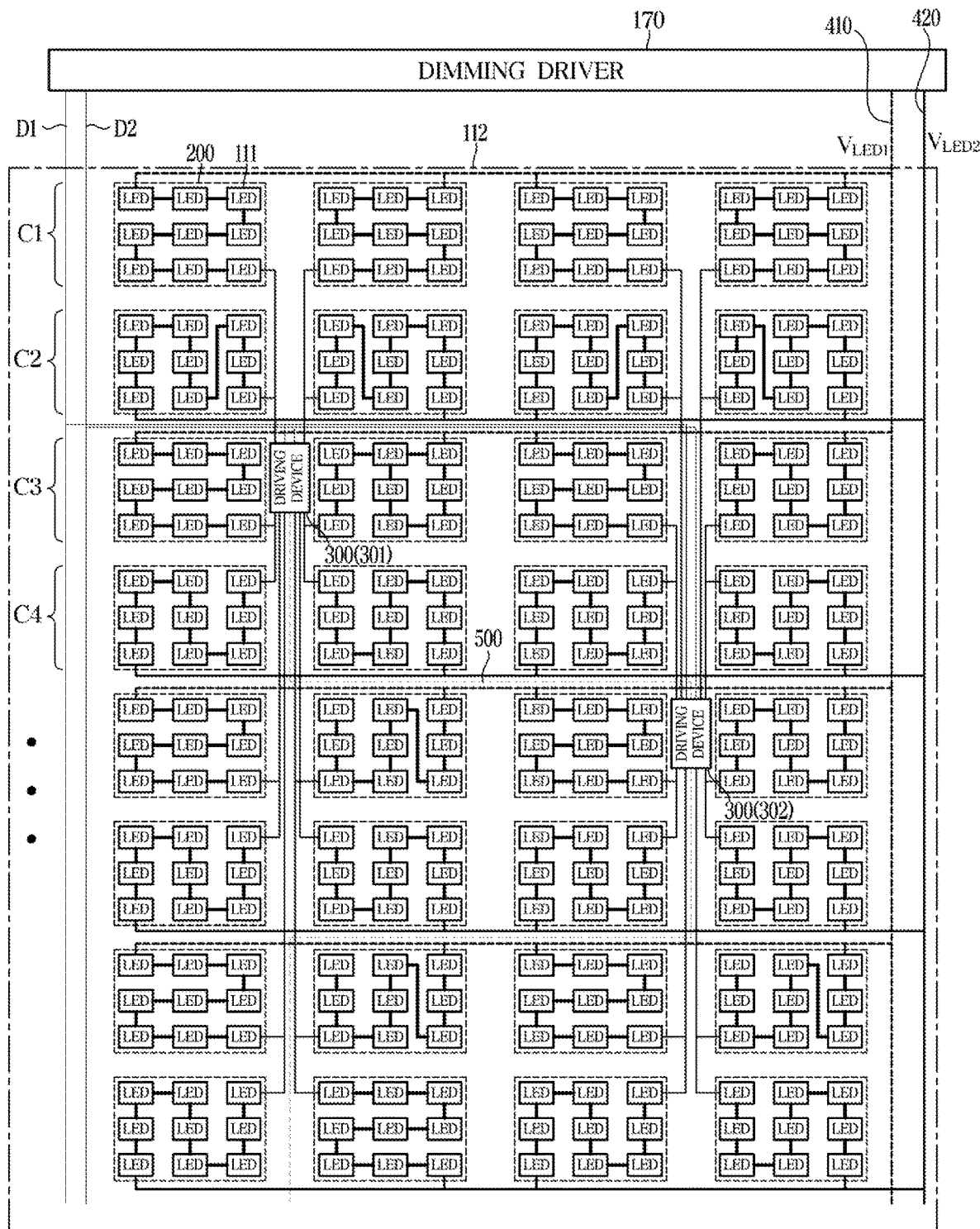
FIG. 14 illustrates an example of an arrangement of power wires of a light apparatus, according to an embodiment.

FIG. 14 illustrates an example of an arrangement of power wires of a light apparatus, according to an embodiment.

Referring to FIG. 14, a light apparatus 100, according to an embodiment, may include two power wires 410 and 420. The technical features of the light apparatus 100 described above with reference to FIGS. 8 to 13 may be applied to the light apparatus 100 described with reference to FIGS. 14 to 15 below. The light apparatus 100 is described focusing on differences from the light apparatus 100 described with reference to FIGS. 8 to 13, for the sake of brevity.

In an embodiment, the light apparatus 100 may include a first power wire 410 for supplying power VLED1 to odd-numbered rows of an array of the plurality of dimming blocks 200 and a second power wire 420 for supplying power VLED2 to even-numbered rows of the array of the plurality of dimming blocks 200.

In this case, at least one processor 91 and/or a dimming driver 170 may perform time-division control through the first power wire 410 and the second power wire 420.

That is, the at least one processor 91 and/or the dimming driver 170 may control power to be alternately supplied to the first power wire 410 and the second power wire 420.

In an embodiment, the first power wire 410 may be provided above a first rows C1 and may extend in the row direction.

The first power wire 410 and the second power wire 420 may be alternately arranged between adjacent rows of the array of the plurality of dimming blocks 200.

In an embodiment, the first power wire 410 may be connected to a start light source of each of the plurality of dimming blocks in a lower row among two adjacent rows. Alternatively or additionally, the second power wire 420 may be connected to a start light source of each of the plurality of dimming blocks in an upper row among the two adjacent rows.

That is, the first power wire 410 and the second power wire 420 disposed in a space between rows and extending in the row direction may extend in different column directions.

For example, the first power wire 410 disposed between a second row C2 and a third row C3 may be connected to the plurality of dimming blocks 200 in the third row C3. For another example, the second power wire 420 disposed between the second row C2 and the third row C3 may be connected to the plurality of dimming blocks 200 in the second row C3.

In an embodiment, a plurality of driving devices 300 may be alternately disposed between columns. For example, a first driving device 301 may be provided between a first column R1 and a second column R2, and a second driving device 302 may be provided between a third column R3 and a fourth column R4.

Unlike the embodiments of FIG. 8 or 12, each of the plurality of driving devices 300 may include a control wire connected to last light sources of dimming blocks 200 in two adjacent rows.

According to an embodiment, as shown in FIG. 12, control wires each connected to one of dimming blocks may be electrically distinguished from each other. However, because two power wires may be provided in the embodiments of FIG. 14, only one control wire connected to two dimming blocks may be needed.

For example, when the power VLED1 is supplied through the first power wire 410, the plurality of driving devices 300 may control a driving current flowing through control wires connected to dimming blocks 200 in odd-numbered rows.

Alternatively or additionally, when the power VLED2 is supplied through the second power wire 420, the plurality of driving devices 300 may control a driving current flowing through control wires connected to dimming blocks 200 in even-numbered rows.

According to an embodiment, the plurality of dimming blocks in adjacent rows may share a control wire to reduce the number of driving devices 300.

Figure 15:
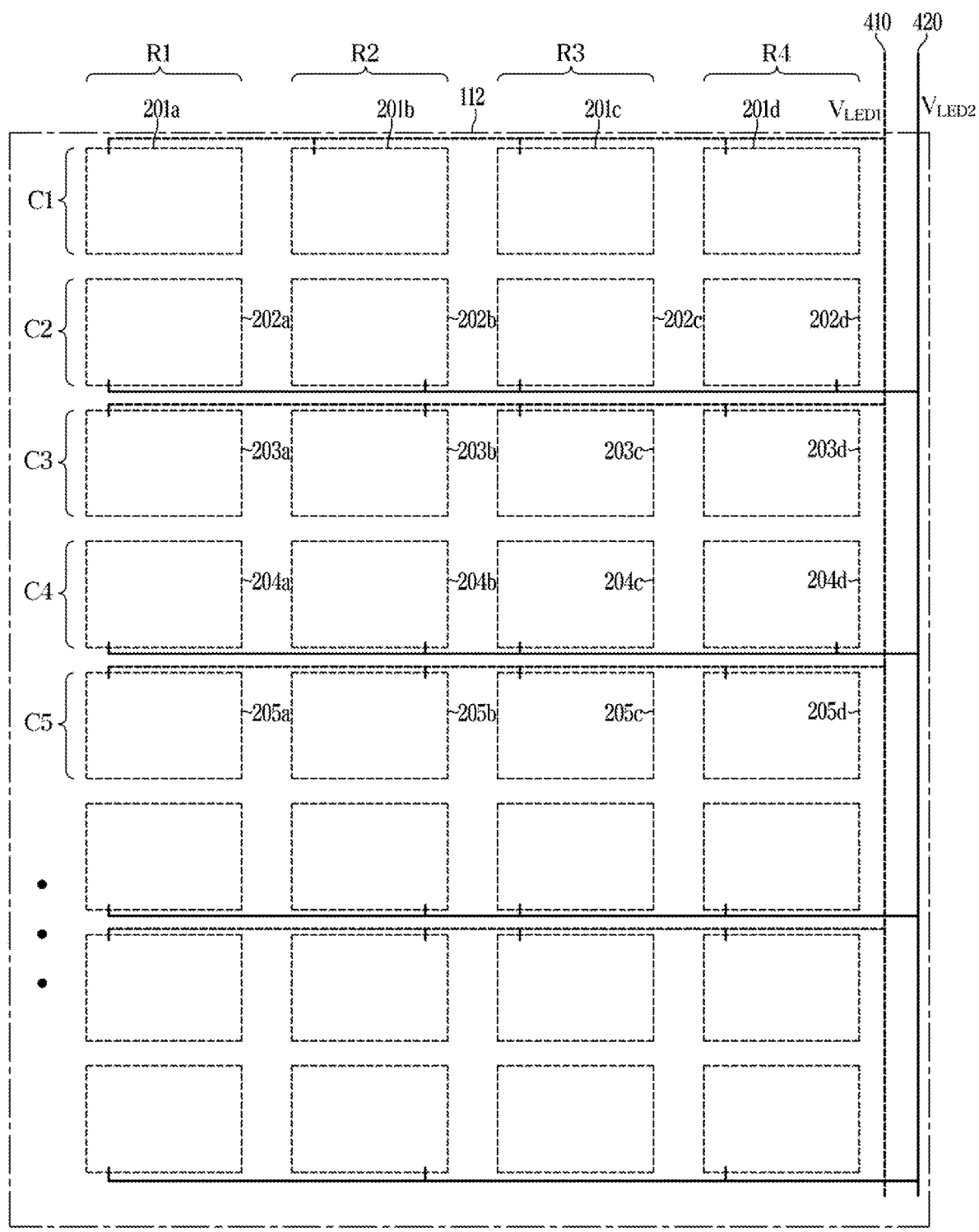
FIG. 15 illustrates an example of an arrangement of power wires for time-division driving of a light apparatus, according to an embodiment.

FIG. 15 illustrates an example of an arrangement of power wires for time-division driving of a light apparatus, according to an embodiment.

Referring to FIG. 15, a first power wire 410 may be provided above a first row C1 to be electrically connected to first dimming blocks.

In an embodiment, the first power wire 410 and the second power wire 420 may be provided between adjacent rows to supply power to the plurality of dimming blocks in different rows.

The first power wire 410 may be provided between a second row C2 and a third row C3 to be electrically connected to second dimming blocks.

The second power wire 420 may be provided between the second row C2 and the third row C3 to be electrically connected to third dimming blocks.

The first power wire 410 may be provided between a fourth row C4 and a fifth row C5 to be electrically connected to fourth dimming blocks 204*a*, 204*b*, 204*c*, and 204*d*.

The second power wire 420 may be provided between the fourth row C4 and the fifth row C5 to be electrically connected to fifth dimming blocks 205a, 205b, 205c, and 205d.

The power VLED1 and the power VLED2 may be alternately supplied to dimming blocks 200 in adjacent rows through the first power wire 410 and the second power wire 420.

According to an embodiment, the first power wire 410 and the second power wire 420 may be provided between adjacent rows, thus potentially improving a degree of freedom in designing a wiring.

Figure 16:
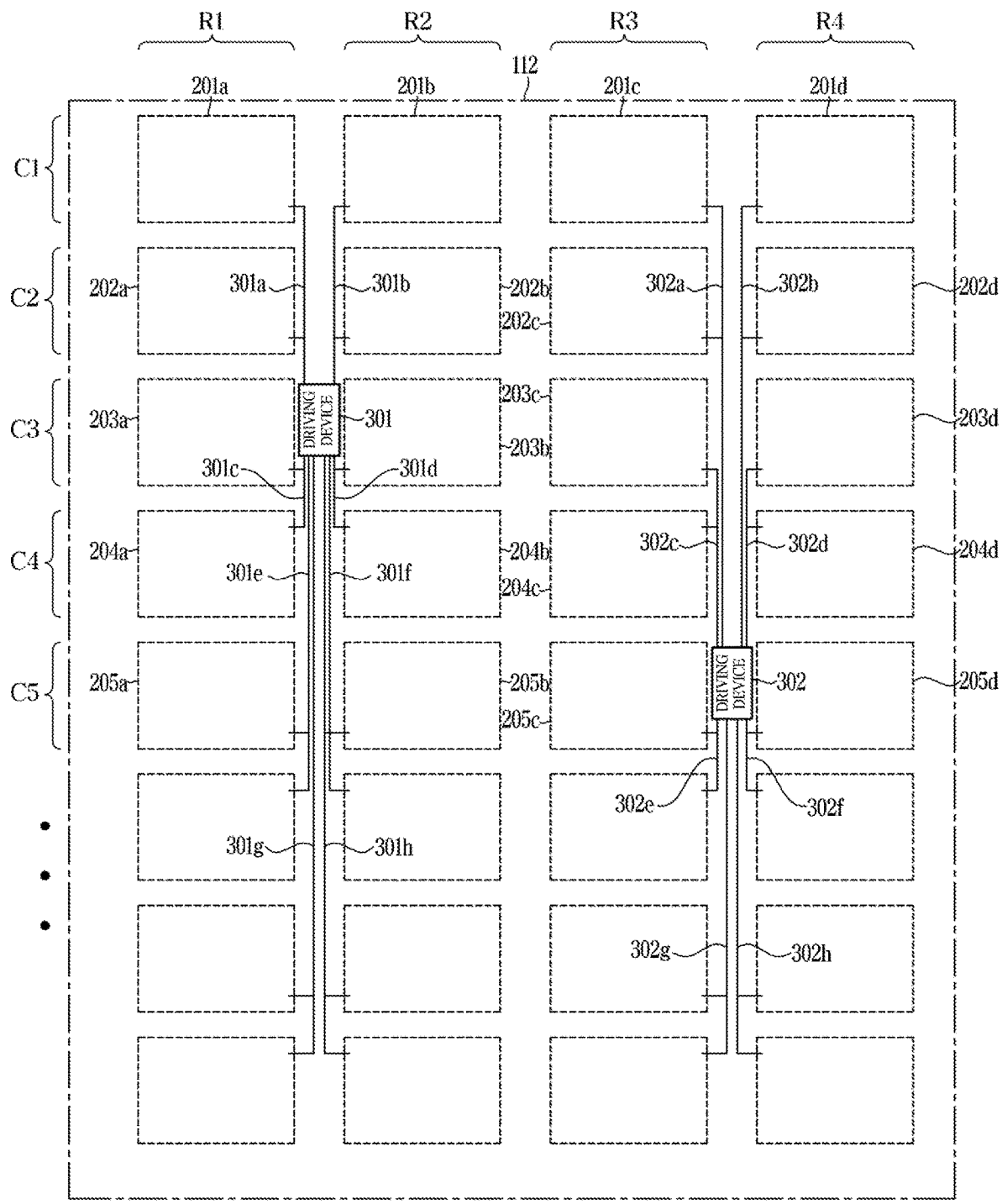
FIG. 16 illustrates a connection relationship between a plurality of driving devices and a dimming block of a light apparatus, according to an embodiment.

FIG. 16 illustrates a relationship between a plurality of driving devices and a dimming block of a light apparatus, according to an embodiment.

Referring to FIG. 16, each of a plurality of driving devices 300 may be electrically connected to N dimming blocks 200 in a left column and N dimming blocks 200 in a right column among the plurality of dimming blocks 200 in two adjacent columns through a control wire. The number (e.g., 2×N) of dimming blocks 200 to which each of the plurality of driving devices 300 is connected may be variously changed, according to an embodiment. For example, the number of control wires may be N.

That is, two dimming blocks 200 may be connected for each control wire.

In an embodiment, two dimming blocks 200 arranged in the same row for one control wire connected to the driving device 300 and arranged in two adjacent rows may be connected to each other.

For example, the first driving device 301 may be disposed between a first column R1 and a second column R2 and may be electrically connected to the plurality of dimming blocks disposed in the first column R1 and the second column R2.

The first driving device 301 may be electrically connected to dimming blocks 201a and 202a, which may be arranged in the first column R1, a first row C1, and a second row C2, through a control wire 301a.

The first driving device 301 may be electrically connected to dimming blocks 201b and 202b, which may be arranged in the second column R2, the first row C1, and the second row C2, through a control wire 301b.

The first driving device 301 may be electrically connected to dimming blocks 203a and 204a, which may be arranged in the first column R1, a third row C3, and a fourth row C4, through a control wire 301c.

The first driving device 301 may be electrically connected to dimming blocks 203b and 204b which may be arranged in the second column R2, the third row C3, and the fourth row C4, through a control wire 301d.

The first driving device 301 may be electrically connected to dimming blocks, which may be arranged in the first column R1, a fifth row C5, and a sixth row, through a control wire 301e.

The first driving device 301 may be electrically connected to dimming blocks, which may be arranged in the second column R2, the fifth row C5, and the sixth row, through a control wire 301f.

The first driving device 301 may be electrically connected to dimming blocks, which may be arranged in the first column R1, a seventh row, and an eighth row, through a control wire 301g.

The first driving device 301 may be electrically connected to dimming blocks, which may be arranged in the second column R2, the seventh row, and the eighth row, through a control wire 301h.

For another example, the second driving device 302 may be disposed between a third column R3 and a fourth column R4 and may be electrically connected to the plurality of dimming blocks disposed in the third column R3 and the fourth column R4.

The second driving device 302 may be electrically connected to dimming blocks 201c and 202c, which may be arranged in the third column R3, the first row C1, and the second row C2, through a control wire 302a.

The second driving device 302 may be electrically connected to dimming blocks 201d and 202d, which may be arranged in the fourth column R4, the first row C1, and the second row C2, through a control wire 302b.

The second driving device 302 may be electrically connected to dimming blocks 203c and 204c, which may be arranged in the third column R3, the third row C3, and the fourth row C4, through a control wire 302c.

The second driving device 302 may be electrically connected to dimming blocks 203d and 204d, which may be arranged in the fourth column R4, the third row C3, and the fourth row C4, through a control wire 302d.

The second driving device 302 may be electrically connected to dimming blocks, which may be arranged in the third column R3, the fifth row C5, and the sixth row, through a control wire 302e.

The second driving device 302 may be electrically connected to dimming blocks, which may be arranged in the fourth column R4, the fifth row C5, and the sixth row, through a control wire 302f.

The second driving device 302 may be electrically connected to dimming blocks, which may be arranged in the third column R3, the seventh row, and the eighth row, through a control wire 302g.

The second driving device 302 may be electrically connected to dimming blocks, which may be arranged in the fourth column R4, the seventh row, and the eighth row, through a control wire 302h.

According to an embodiment, the number of dimming blocks connected to one driving device may be increased to reduce the number of driving devices.

The embodiments set forth herein may be embodied as a recording medium storing computer-executable instructions. The instructions may be stored in the form of program code, and the operations of the embodiments set forth herein may be performed when the instructions are executed by a processor. The recording medium may be implemented as a computer-readable recording medium.

Examples of the computer-readable recording medium include various types of recording media storing instructions interpretable by a computer. Examples of the computer-readable recording medium may include a read-only memory (ROM), a random access memory (RAM), a magnetic tape, a magnetic disk, a flash memory, an optical data storage device, and the like.

The computer-readable recording medium may be provided as a non-transitory storage medium. Here, the term 'non-transitory storage medium' should be understood to mean a tangible device and to not include a signal (e.g., electromagnetic waves) but is not intended to distinguish between a case in which data is semi-permanently stored in the storage medium and a case in which data is temporarily stored in the storage medium. For example, the 'non-transitory storage medium' may include a buffer in which data is temporarily stored.

In the present disclosure, methods according to various embodiments of the disclosure may be provided by being included in a computer program product. The computer program product may be traded as a product between a seller and a purchaser. The computer program product may be distributed in the form of a recording medium (e.g., compact disc read only memory (CD-ROM)) that is readable by devices, may be distributed through an application store (e.g., Play Store™), directly between two user devices (e.g., smartphones), and/or may be distributed online (e.g., by downloading or uploading). In the case of an online distribution, at least part of the computer program product (e.g., a downloadable application) may be at least temporarily stored and/or temporarily generated in a recording medium readable by devices such as the manufacturer's server, a server of an application store, or a memory of a relay server.

The embodiments set forth herein have been described above with reference to the accompanying drawings. It will be understood by those of ordinary skill in the technical field to which the present disclosure pertains that the present disclosure may be implemented in a different form than those of the embodiments set forth herein without departing from the technical idea or essential features of the present disclosure. These embodiments are only examples and should not be interpreted in a restrictive manner.

What is claimed is:

1. A display apparatus, comprising:
a liquid crystal panel; and
a light apparatus comprising:
a substrate comprising a plurality of dimming blocks that are arranged in a matrix, each dimming block of the plurality of dimming blocks comprising a plurality of light sources;
a power wire configured to supply a driving voltage to the plurality of light sources of the plurality of dimming blocks; and
a plurality of driving devices configured to control a driving current supplied to the plurality of dimming blocks,
wherein the plurality of dimming blocks comprises a first dimming block comprising a first plurality of light sources, a second dimming block comprising a second plurality of light sources, and a third dimming block comprising a third plurality of light sources, the first dimming block being arranged in an $n^{th}$ row, the second dimming block being arranged in an $(n+1)^{th}$ row adjacent to the $n^{th}$ row, and the third dimming block being arranged in an $(n+2)^{th}$ row adjacent to the $(n+1)^{th}$ row, wherein n is a natural number,
wherein the power wire is arranged between the $n^{th}$ row corresponding to the first dimming block and the $(n+1)^{th}$ row corresponding to the second dimming block,
wherein the power wire is absent between the $(n+1)^{th}$ row corresponding to the second dimming block and the $(n+2)^{th}$ row corresponding to the third dimming block, and
wherein the power wire is electrically connected to a first light source of the first plurality of light sources to supply the driving voltage to the first light source of the first plurality of light sources and to a second light source of the second plurality of light sources to supply the driving voltage to the second light source of the second plurality of light sources.

2. The display apparatus of claim 1, wherein:
the plurality of dimming blocks further comprises a fourth dimming block arranged in an $(n+3)^{th}$ row adjacent to the $(n+2)^{th}$ row,
the fourth dimming block comprises a fourth plurality of light sources,
the power wire is arranged between the $(n+2)^{th}$ row corresponding to the third dimming block and the $(n+3)^{th}$ row corresponding to the fourth dimming block, and
the power wire is electrically connected to a third light source of the third plurality of light sources and to a fourth light source of the fourth plurality of light sources.

3. The display apparatus of claim 1, wherein the first light source is adjacent to the second light source in the column direction.

4. The display apparatus of claim 1, wherein:
the first plurality of light sources is arranged in a first matrix in the first dimming block,
the second plurality of light sources is arranged in a second matrix in the second dimming block,
the plurality of driving devices comprises a first driving device configured to control a first driving current supplied to the first dimming block and the second dimming block,
a fifth light source of the first plurality of light sources is electrically connected to the first driving device,
a sixth light source of the second plurality of light sources is electrically connected to the first driving device, and
the fifth light source and the sixth light source are arranged in a same column.

5. The display apparatus of claim 4, wherein the first light source electrically connected to the power wire and the fifth light source electrically connected to the first driving device are arranged in a same row.

6. The display apparatus of claim 5, wherein the second light source electrically connected to the power wire and the sixth light source electrically connected to the first driving device are arranged farthest from each other among the second plurality of light sources.

7. The display apparatus of claim 1, wherein:
the first plurality of light sources are arranged in a first matrix in the first dimming block,
the second plurality of light sources are arranged in a second matrix in the second dimming block,
the first plurality of light sources are electrically connected to each other in series,
the second plurality of light sources are electrically connected to each other in series, and
a first pattern of a first wire coupling the first plurality of light sources to each other in series is different from a second pattern of a second wire coupling the second plurality of light sources to each other in series.

8. The display apparatus of claim 1, wherein:
the first plurality of light sources is arranged in a first matrix in the first dimming block,
a third light source of the first plurality of light sources is electrically connected to a first driving device of the plurality of driving devices, and
the first light source electrically connected to the power wire and the third light source electrically connected to the first driving device are arranged in a same row.

9. The display apparatus of claim 8, wherein:
the second plurality of light sources are arranged in a second matrix in the second dimming block,
a fourth light source of the second plurality of light sources is electrically connected to the first driving device, and
the second light source electrically connected to the power wire and the fourth light source electrically connected to the first driving device are arranged in rows disposed farthest from each other.

10. The display apparatus of claim 1, further comprising:
a plurality of data lines configured to transmit data signals to the plurality of driving devices; and
a dimming driver configured to transmit the data signals to the plurality of driving devices through the plurality of data lines based on dimming data corresponding to an input image.

11. The display apparatus of claim 1, further comprising:
a plurality of scan lines configured to transmit scan signals to the plurality of driving devices; and
a dimming driver configured to transmit the scan signals to the plurality of driving devices through the plurality of scan lines.

12. The display apparatus of claim 1, further comprising a dimming driver configured to supply the driving voltage to the plurality of dimming blocks through the power wire.

13. The display apparatus of claim 1, wherein a first driving device from among the plurality of driving devices is configured to control driving currents supplied to at least two dimming blocks of the plurality of dimming blocks arranged in two adjacent rows.

14. The display apparatus of claim 13, wherein:
the plurality of light sources comprised by each dimming block of the plurality of dimming blocks is arranged in another matrix, and
at least two light sources electrically connected to the first driving device are arranged in a column adjacent to the first driving device.

15. A light apparatus, comprising:
a substrate comprising a plurality of dimming blocks that are arranged in a matrix, each dimming block of the plurality of dimming blocks comprising a plurality of light sources;
a power wire configured to supply a driving voltage to the plurality of light sources of the plurality of dimming blocks; and
a plurality of driving devices configured to control a driving current supplied to the plurality of dimming blocks,
wherein the plurality of dimming blocks comprises a first dimming block comprising a first plurality of light sources, a second dimming block comprising a second plurality of light sources, and a third dimming block comprising a third plurality of light sources, the first dimming block being arranged in an $n^{th}$ row, the second dimming block being arranged in an $(n+1)^{th}$ row adjacent to the $n^{th}$ row, and the third dimming block being arranged in an $(n+2)^{th}$ row adjacent to the $(n+1)^{th}$ row, wherein n is a natural number,
wherein the power wire is arranged between the $n^{th}$ row corresponding to the first dimming block and the $(n+1)^{th}$ row corresponding to the second dimming block,
wherein the power wire is absent between the $(n+1)^{th}$ row corresponding to the second dimming block and the $(n+2)^{th}$ row corresponding to the third dimming block, and
wherein the power wire is electrically connected to a first light source of the first plurality of light sources to supply the driving voltage to the first light source of the first plurality of light sources and to a second light source of the second plurality of light sources to supply the driving voltage to the second light source of the second plurality of light sources.

16. The light apparatus of claim 15, wherein:
the plurality of dimming blocks further comprises a fourth dimming block arranged in an $(n+3)^{th}$ row adjacent to the $(n+2)^{th}$ row,
the fourth dimming block comprises a fourth plurality of light sources,
the power wire is arranged between the $(n+2)^{th}$ row corresponding to the third dimming block and the $(n+3)^{th}$ row corresponding to the fourth dimming block, and
the power wire is electrically connected to a third light source of the third plurality of light sources and to a fourth light source of the fourth plurality of light sources.

17. The light apparatus of claim 15, wherein the first light source is adjacent to the second light source in the column direction.

18. The light apparatus of claim 15, wherein:
the first plurality of light sources is arranged in a first matrix in the first dimming block,
the second plurality of light sources is arranged in a second matrix in the second dimming block,
the plurality of driving devices comprises a first driving device configured to control a first driving current supplied to the first dimming block and the second dimming block,
a third light source of the first plurality of light sources is electrically connected to the first driving device,
a fourth light source of the second plurality of light sources is electrically connected to the first driving device, and
the third light source and the fourth light source are arranged in a same column.

* * * * *